US012417566B2

(12) United States Patent
Kwong et al.

(10) Patent No.: US 12,417,566 B2
(45) Date of Patent: Sep. 16, 2025

(54) CONVOLUTION AND TRANSFORMER BASED COMPRESSIVE SENSING

(71) Applicant: City University of Hong Kong, Kowloon (HK)

(72) Inventors: Sam Tak Wu Kwong, Kowloon (HK); Dongjie Ye, Kowloon (HK); Zhangkai Ni, Kowloon (HK)

(73) Assignee: City University of Hong Kong, Kowloon (HK)

( * ) Notice: Subject to any disclaimer, the term of this patent is extended or adjusted under 35 U.S.C. 154(b) by 466 days.

(21) Appl. No.: 18/050,564

(22) Filed: Oct. 28, 2022

(65) Prior Publication Data

US 2024/0153161 A1    May 9, 2024

(51) Int. Cl.
*G06T 11/00*    (2006.01)
(52) U.S. Cl.
CPC .................. *G06T 11/006* (2013.01)
(58) Field of Classification Search
CPC .................................................. G06T 11/006
See application file for complete search history.

(56) References Cited

U.S. PATENT DOCUMENTS

| 8,666,180 | B2 | 3/2014 | Sen et al. | |
|---|---|---|---|---|
| 9,373,159 | B2 | 6/2016 | Amroabadi et al. | |
| 9,892,527 | B2 * | 2/2018 | Ye | G06T 11/005 |
| 11,270,477 | B2 * | 3/2022 | Nett | G06F 17/15 |
| 11,816,765 | B2 * | 11/2023 | Andrew | G06T 5/70 |
| 11,875,813 | B2 * | 1/2024 | Mesgarani | G09B 21/00 |

(Continued)

FOREIGN PATENT DOCUMENTS

CN    103595414    2/2014

OTHER PUBLICATIONS

Dongjie Ye, Graduate Student Member, IEEE, Zhangkai Ni, Graduate Student Member, IEEE, Hanli Wang, Senior Member, IEEE, Jian Zhang, Member, IEEE, Shiqi Wang, Senior Member, IEEE, and Sam Kwong, Fellow, IEEE, CSformer: Bridging Convolution and Transformer for Compressive Sensing, Dec. 2021, IEEE (Year: 2021).*

(Continued)

*Primary Examiner* — Kevin Ky
(74) *Attorney, Agent, or Firm* — Renner, Kenner, Greive, Bobak, Taylor & Weber

(57) ABSTRACT

A method for adaptive reconstruction of a compressively sensed data. The method contains the steps of receiving sensed data; conducting an initial reconstruction to the sensed data to obtain a plurality of first reconstruction patches; by a reconstruction module, conducting a progressive reconstruction to the sensed data to obtain a plurality of second reconstruction patches; summing the plurality of second reconstruction patches with the a plurality of first reconstruction patches to obtain final patches; and merging the final patches to obtain a reconstructed data. The progressive reconstruction further contains concatenating transformer features and convolution features to obtain the second reconstruction patches. The invention provides a hybrid network for adaptive sampling and reconstruction of CS, which integrates the advantages of leveraging both detailed spatial information from CNN and the global context provided by transformer for enhanced representation learning.

15 Claims, 9 Drawing Sheets

(56) References Cited

U.S. PATENT DOCUMENTS

| | | | | |
|---|---|---|---|---|
| 12,010,302 | B2* | 6/2024 | Kim | H04N 19/30 |
| 12,272,375 | B2* | 4/2025 | Ozturk | H04W 4/021 |
| 2014/0205170 | A1* | 7/2014 | Cierniak | G06T 11/006 |
| | | | | 382/131 |
| 2017/0169586 | A1* | 6/2017 | Ding | G06T 11/003 |
| 2020/0234406 | A1* | 7/2020 | Ren | G06T 3/4046 |
| 2021/0193112 | A1* | 6/2021 | Cui | G10L 13/047 |
| 2022/0277452 | A1* | 9/2022 | Vaidyanathan | G16H 30/40 |
| 2023/0104757 | A1* | 4/2023 | Pramod | G06N 3/0475 |
| | | | | 706/11 |
| 2023/0109260 | A1* | 4/2023 | Bald | G06N 3/0442 |
| | | | | 706/21 |
| 2024/0070853 | A1* | 2/2024 | Yoo | G06V 10/765 |
| 2024/0081705 | A1* | 3/2024 | Zhao | G06V 40/171 |
| 2025/0087041 | A1* | 3/2025 | Linari | H04W 4/38 |

OTHER PUBLICATIONS

T. Xiao, M. Singh, E. Mintun, T. Darrell, P. Dollar, and R. B. Girshick, "Early convolutions help transformers see better," In Proceedings of the Advances in Neural Information Processing Systems, 2021.

M. Raghu, T. Unterthiner, S. Kornblith, C. Zhang, and A. Dosovitskiy, "Do vision transformers see like convolutional neural networks?" in Proceedings of the Advances in Neural Information Processing Systems, 2021.

D. Martin, C. Fowlkes, D. Tal, and J. Malik, "A database of human segmented natural images and its application to evaluating segmentation algorithms and measuring ecological statistics," in Proceedings of the IEEE International Conference on Computer Vision, vol. 2, 2001, pp. 416-423.

M. Bevilacqua, A. Roumy, C. Guillemot, and M.-L. A. Morel, "Low-complexity single-image super-resolution based on honnegative neighbor embedding," in Proceedings of the British Machine Vision Conference, 2012, pp. 1-10.

R. Zeyde, M. Elad, and M. Protter, "On single image scale-up using sparse-representations," in Proceedings of the International Conference on Curves and Surfaces, 2010, pp. 711-730.

J.-B. Huang, A. Singh, and N. Ahuja, "Single image super-resolution from transformed self-exemplars," in Proceedings of the IEEE Conference on Computer Vision and Pattern Recognition, 2015, pp. 5197-5206.

Z. Ni, H. Zeng, L. Ma, J. Hou, J. Chen, and K.-K. Ma, "A gabor feature-based quality assessment model for the screen content images," IEEE Transactions on Image Processing, vol. 27, No. 9, pp. 4516-4528, 2018.

P. Arbelaez, M. Maire, C. Fowlkes, and J. Malik, "Contour detection and hierarchical image segmentation," IEEE Transactions on Pattern Analysis and Machine Intelligence, vol. 33, No. 5, pp. 898-916, 2011.

K. G. Derpanis and R. Wildes, "Spacetime texture representation and recognition based on a spatiotemporal orientation analysis," IEEE Transactions on Pattern Analysis and Machine Intelligence, vol. 34, No. 6, pp. 1193-1205, 2011.

P. Saisan, G. Doretto, Y. N. Wu, and S. Soatto, "Dynamic texture recognition," in Proceedings of the IEEE Conference on Computer Vision and Pattern Recognition, vol. 2, 2001, pp. II-II.

R. Peteri, S. Fazekas, and M. J. Huiskes, "Dyntex: A comprehensive database of dynamic textures," Pattern Recognition Letters, vol. 31, No. 12, pp. 1627-1632, 2010.

I. Hadji and R. P. Wildes, "A new large scale dynamic texture dataset with application to convnet understanding," in Proceedings of the European Conference on Computer Vision, 2018, pp. 320-335.

Y. Fang, H. Zhu, K. Ma, Z. Wang, and S. Li, "Perceptual evaluation for multi-exposure image fusion of dynamic scenes," IEEE Transactions on Image Processing, vol. 29, No. 1, pp. 1127-1138, 2020.

S. Kornblith, M. Norouzi, H. Lee, and G. Hinton, "Similarity of neural network representations revisited," in Proceedings of the International Conference on Machine Learning, 2019, pp. 3519-3529.

D. L. Donoho, "Compressed sensing," IEEE Transactions on Information Theory, vol. 52, No. 4, pp. 1289-1306, 2006.

J. Zhang, D. Zhao, C. Zhao, R. Xiong, S. Ma, and W. Gao, "Image compressive sensing recovery via collaborative sparsity," IEEE Journal on Emerging and Selected Topics in Circuits and Systems, vol. 2, No. 3, pp. 380-391, 2012.

J. Zhang, C. Zhao, D. Zhao, and W. Gao, "Image compressive sensing recovery using adaptively learned sparsifying basis via I0 minimization," Signal Processing, vol. 103, pp. 114-126, 2014.

M. E. Ahsen and M. Vidyasagar, "Error bounds for compressed sensing algorithms with group sparsity: A unified approach," Applied and Computational Harmonic Analysis, vol. 43, No. 2, pp. 212-232, 2017.

K. Kulkarni, S. Lohit, p. Turaga, R. Kerviche, and A. Ashok, "Reconnet: Non-iterative reconstruction of images from compressively sensed measurements," in Proceedings of the IEEE Conference on Computer Vision and Pattern Recognition, 2016, pp. 449-458.

C. A. Metzler, A. Mousavi, and R. G. Baraniuk, "Learned d-amp: Principled! neural network based compressive image recovery," in Proceedings of the Advances in Neural Information Processing Systems, 2017, pp. 1773-1784.

W. Shi, F. Jiang, S. Zhang, and D. Zhao, "Deep networks for compressed image sensing," in Proceedings of the IEEE International Conference on Multimedia and Expo, 2017, pp. 877-882.

J. Zhang and B. Ghanem, "Ista-net: Interpretable optimization-inspired deep network for image compressive sensing," In Proceedings of the IEEE Conference on Computer Vision and Pattern Recognition, 2018, pp. 1828-1837.

Y. Yang, J. Sun, H. Li, and Z. Xu, "Admm-csnet: A deep learning approach for image compressive sensing," IEEE Transactions on Pattern Analysis and Machine Intelligence, vol. 42, No. 3, pp. 521-538, 2018.

M. Kabkab, P. Samangouei, and R. Chellappa, "Task-aware compressed sensing with generative adversarial networks," in Proceedings of the AAAI Conference on Artificial Intelligence, vol. 32, No. 1, 2018.

W. Shi, F. Jiang, S. Liu, and D. Zhao, "Image compressed sensing using convolutional neural network," IEEE Transactions on Image Processing, vol. 29, pp. 375-388, 2020.

J. Zhang, C. Zhao, and W. Gao, "Optimization-inspired compact deep compressive sensing," IEEE Journal of Selected Topics in Signal Processing, vol. 14, No. 4, pp. 765-774, 2020.

Z. Zhang, Y. Liu, J. Liu, F. Wen, and C. Zhu, "Amp-net: Denoising-based deep unfolding for compressive image sensing," IEEE Transactions on Image Processing, vol. 30, pp. 1487-1500, 2020.

D. You, J. Zhang, J. Xie, B. Chen, and S. Ma, "Coast: Controllable arbitrary-sampling network for compressive sensing," IEEE Transactions on Image Processing, vol. 30, pp. 6066-6080, 2021.

D. You, J. Xie, and J. Zhang, "Ista-net++: Flexible deep unfolding network for compressive sensing," in Proceedings of the IEEE International Conference on Multimedia and Expo, 2021, pp. 1-6.

Y. Sun, J. Chen, Q. Liu, and G. Liu, "Learning image compressed sensing with sub-pixel convolutional generative adversarial network," Pattern Recognition, vol. 98, p. 107051, 2020.

J. Chen, Y. Sun, Q. Liu, and R. Huang, "Learning memory augmented cascading network for compressed sensing of mages," in Proceedings of the European Conference on Computer Vision, 2020, pp. 513-529.

Y. Sun, Y. Yang, Q. Liu, J. Chen, X.-T. Yuan, and G. Guo, "Learning non-locally regularized compressed sensing network with half-quadratic splitting," IEEE Transactions on Multimedia, vol. 22, No. 12, pp. 3236-3248, 2020.

A. Bora, A. Jalal, E. Price, and A. G. Dimakis, "Compressed sensing using generative models," in Proceedings of the International Conference on Machine Learning, 2017, pp. 537-546.

A. Mousavi, G. Dasarathy, and R. G. Baraniuk, "Deepcodec: Adaptive sensing and recovery via deep convolutional neural networks," arXiv preprint arXiv:1707.03386, 2017.

(56) References Cited

OTHER PUBLICATIONS

K. Xu, Z. Zhang, and F. Ren, "Lapran: A scalable laplacian pyramid reconstructive adversarial network for flexible compressive sensing reconstruction," in Proceedings of the European Conference on Computer Vision, 2018, pp. 485-500.
Y. Wu, M. Rosca, and T. Lillicrap, "Deep compressed sensing," in Proceedings of the International Conference on Machine Learning. PMLR, 2019, pp. 6850-6860.
Y. Sun, J. Chen, Q. Liu, B. Liu, and G. Guo, "Dual-path attention network for compressed sensing image reconstruction," IEEE Transactions on Image Processing, vol. 29, pp. 9482-9495, 2020.
H. Yao, F. Dai, S. Zhang, Y. Zhang, Q. Tian, and C. Xu, "Dr2-net: Deep residual reconstruction network for image compressive sensing," Neurocomputing, vol. 359, pp. 483-493, 2019.
A. Vaswani, N. Shazeer, N. Parmar, J. Uszkoreit, L. Jones, A. N. Gomez, L. Kaiser, and I. Polosukhin, "Attention is all you need," in Proceedings of the Advances in Neural Information Processing Systems, 2017, pp. 5998-6008.
A. Dosovitskiy, L. Beyer, A. Kolesnikov, D. Weissenborn, X. Zhai, T. Unterthiner, M. Dehghani, M. Minderer, G. Heigold, S. Gelly, J. Uszkoreit, and N. Houlsby, "An image is worth 16x16 words: Transformers for image recognition at scale," in Proceedings of the International Conference on Learning Representations, 2020.
H. Chen, Y. Wang, T. Guo, C. Xu, Y. Deng, Z. Liu, S. Ma, C. Xu, C. Xu, and W. Gao, "Pre-trained image processing transformer," in Proceedings of the IEEE Conference on Computer Vision and Pattern Recognition, 2021, pp. 12299-12310.
Z. Wang, X. Cun, J. Bao, W. Zhou, J. Liu, and H. Li, "Uformer: A general u-shaped transformer for image restoration," In Proceedings of the IEEE Conference on Computer Vision and Pattern Recognition, 2022, pp. 17683-17693.
Y. Jiang, S. Chang, and Z. Wang, "Transgan: Two pure transformers can make one strong gan, and that can scale up," vol. 34, 2021.
J. You, T. Ebrahimi, and A. Perkis, "Attention driven foveated video quality assessment," IEEE Transactions on Image Processing, vol. 23, No. 1, pp. 200-213, 2014.
T. Chen, H. Liu, Z. Ma, Q. Shen, X. Cao, and Y. Wang, "End-to-end learnt image compression via non-local attention optimization and improved context modeling," IEEE Transactions on Image Processing, vol. 30, pp. 3179-3191, 2021.
K. Han, Y. Wang, H. Chen, X. Chen, J. Guo, Z. Liu, Y. Tang, A. Xiao, C. Xu, Y. Xu, Z. Yang, Y. Zhang, and D. Tao, "A survey on vision transformer," IEEE Transactions on Pattern Analysis and Machine Intelligence, pp. 1-1, 2022.
S. S. Chen, D. L. Donoho, and M. A. Saunders, "Atomic decomposition by basis pursuit," SIAM review, vol. 43, No. 1, pp. 129-159, 2001.
R. Tibshirani, "Regression shrinkage and selection via the lasso," Journal of the Royal Statistical Society: Series B (Methodological), vol. 58, No. 1, pp. 267-288, 1996.
A. Beck and M. Teboulle, "A fast iterative shrinkage-thresholding algorithm for linear inverse problems," SIAM Journal on Imaging Sciences, vol. 2, No. 1, pp. 183-202, 2009.
M. V. Afonso, J. M. Bioucas-Dias, and M. A. Figueiredo, "An augmented lagrangian approach to the constrained optimization formulation of imaging inverse problems," IEEE Transactions on Image Processing, vol. 20, No. 3, pp. 681-695, 2010.
C. Li, W. Yin, H. Jiang, and Y. Zhang, "An efficient augmented lagrangian method with applications to total variation minimization," Computational Optimization and Applications, vol. 56, No. 3, pp. 507-530, 2013.
C. A. Metzler, A. Maleki, and R. G. Baraniuk, "From denoising to compressed sensing," IEEE Transactions on Information Theory, vol. 62, No. 9, pp. 5117-5144, 2016.
D. L. Donoho, A. Maleki, and A. Montanari, "Message-passing algorithms for compressed sensing," Proceedings of the National Academy of Sciences, vol. 106, No. 45, pp. 18914-18919, 2009.
M. Mardani, E. Gong, J. Y. Cheng, S. Vasanawala, G. Zaharchuk, M. Alley, N. Thakur, S. Han, W. Dally, J. M. Pauly et al., "Deep generative adversarial networks for compressed sensing automates mri," arXiv preprint arXiv:1706.00051, 2017.
A. Radford, L. Metz, and S. Chintala, "Unsupervised representation learning with deep convolutional generative adversarial networks," in Proceedings of the International Conference on Learning Representations, 2016.
X. Wang, R. Girshick, A. Gupta, and K. He, "Non-local neural networks," in Proceedings of the IEEE conference on Computer Vision and Pattern Recognition, 2018, pp. 7794-7803.
Z. Liu, Y. Lin, Y. Cao, H. Hu, Y. Wei, Z. Zhang, S. Lin, and B. Guo, "Swin transformer: Hierarchical vision transformer using shifted windows," in Proceedings of the IEEE International Conference on Computer Vision, 2021, pp. 10012-10022.
I. Goodfellow, J. Pouget-Abadie, M. Mirza, B. Xu, D. Warde-Farley, S. Ozair, A. Courville, and Y. Bengio, "Generative adversarial nets," in Proceedings of the Advances in Neural Information Processing Systems, 2014, pp. 2672-2680.
Z. Ni, W. Yang, S. Wang, L. Ma, and S. Kwong, "Unpaired image enhancement with quality-attention generative adversarial network," in Proceedings of the ACM International Conference on Multimedia, 2020, pp. 1697-1705.
Z. Ni, W. Yang, S. Wang, L. Ma, and S. Kwong, "Towards unsupervised deep image enhancement with generative adversarial network," IEEE Transactions on Image Processing, vol. 29, pp. 9140-9151, 2020.
Y. Xie, J. Zhang, C. Shen, and Y. Xia, "Cotr: Efficiently bridging cnn and transformer for 3d medical image segmentation," in Proceedings of the International conference on medical image computing and computer-assisted Intervention, 2021.
Z. Dai, H. Liu, Q. V. Le, and M. Tan, "Coatnet: Marrying convolution and attention for all data sizes," in Proceedings of the Advances in Neural Information Processing Systems, vol. 34, 2021, pp. 3965-3977.
Z. Peng, W. Huang, S. Gu, L. Xie, Y. Wang, J. Jiao, and Q. Ye, "Conformer: Local features coupling global representations for visual recognition," in Proceedings of the IEEE International Conference on Computer Vision, 2021, pp. 367-376.
S. d'Ascoli, H. Touvron, M. L. Leavitt, A. S. Morcos, G. Biroli, and L. Sagun, "Convit: Improving vision transformers with soft convolutional inductive biases," in Proceedings of the International Conference on Machine Learning, 2021, pp. 2286-2296.

\* cited by examiner

Fig. 4

CONVOLUTION AND TRANSFORMER BASED COMPRESSIVE SENSING

FIELD OF INVENTION

This invention relates to signal processing, and in particular to compressive sensing techniques such as those used for images.

BACKGROUND OF INVENTION

Compressive sensing (CS) theory demonstrates that a signal can be recovered from much fewer acquired measurements than prescribed by Nyquist theorem with a high probability when the signal is sparse in certain transform domains [1]. The benefits of reducing sampling rate allow low-cost and efficient data compression, thereby relieving data storage and transmission bandwidth burden. These inherent merits enable it to be very desirable in a series of applications, such as single-pixel camera, magnetic resonance imaging, and snapshot compressive imaging.

In a compressive image sensing method, for the image $x \in R^N$, the sampling stage first performs fast sampling of x to obtain the linear random measurements $y = \Phi x \in R^M$. Here, $\Phi \in R^{M \times N}$ is the sensing matrix with M<<N, and M/N denotes the CS sampling ratio. In the recovery stage, the goal is to infer the original image x given y. Such inverse problem is typically under-determined because the number of unknowns N is much larger than the number of observations M. To address this problem, traditional CS methods [2]-[4] explore the sparsity as an image prior and find the sparsest signal among all measurements y by iteratively optimizing the sparsity-regularized problem. Although these methods usually have theoretical guarantees and simultaneously inherit interpretability, they inevitably suffer from the high computational cost dictated by the iterative calculations.

Compared to the conventional CS methods, neural networks have been leveraged to solve the image CS reconstruction problems by directly learning the inverse mapping from the compressive measurements to the original images. Recently, with the advent of deep learning (DL), diverse data-driven deep neural network models for CS have been shown to achieve impressive reconstruction quality and efficient recovery speed [5]—[18]. In addition, the DL based CS methods often jointly learn the sampling and the reconstruction network to further improve the performance [7], [12], [13], [15].

In the existing CS literature, the DL based CS methods can be divided into two categories. The first is deep unfolding methods [6], [8], [9], [12], [13], [15], which leverage the deep neural network to mimic the iterative restoration algorithms. They attempt to maintain the merits of both iterative recovery methods and the data-driven network methods by mapping each iteration into a network layer. The deep unfolding approaches can extend the representation capacity over iterative algorithms and avoid the limited interpretability of deep neural networks. The second group is the feedforward methods [5], [7], [10], [11], [16]—[24] that are free from any handcrafted constraint. These methods can reconstruct images by one pass feedforward of the learned convolutional neural network (CNN) given the measurements y. However, the principle of local processing limits CNN in terms of receptive fields and brings challenges in capturing long-range dependencies. Moreover, the weight sharing of the convolution layer leads the interactions between images and filters to be content-independent. Numerous efforts have been devoted to addressing these problems, such as enlarging the kernel size of convolution, using multi-scale reconstruction, dynamic convolution, and the attention mechanism. Sun et al. [16] explore the non-local prior to guide the network in view of the long-range dependencies problem. Furthermore, Sun et al. [23] attempt to adopt dual-path attention network for CS, where the recovery structure is divided into structure and texture paths. Despite amplifying the ability of context modeling to some extent, these approaches are still unable to escape from the limitation of the locality, stranded by the CNN architecture.

Unlike prior convolution-based deep neural networks, transformer [25], designed initially for sequence-to-sequence prediction in NLP domain, is well-suited to modeling global contexts due to the self-attention-based architectures. Inspired by the significant revolution of transformer in NLP, several researchers recently attempt to integrate the transformer into computer vision tasks, including image classification [26], image processing [27], [28], and image generation [29]. With the simple and general-purpose neural architecture, transformer has been considered as an alternative to CNN and strived for better performance. However, a naive application of transformer to CS reconstruction may not produce sufficiently competitive results that match the performance of CNN. The reason is that transformer can capture high-level semantics due to the global self-attention, which is helpful for image classification but lacks the low-level details for image restoration. In general, CNN has better generalization ability and faster convergence speed with its strong biases towards feature locality and spatial invariance, making it very efficient for the image. Nevertheless, some problems still remain about how to precisely embed these two types of features. First, most methods are based on high-level tasks, and the applicability of CS is unknown. Secondly, convolution for local patterns but self-attention for global representations are two conflicting properties. Third, the explosive computational complexity and colossal memory explosion for high resolution reconstruction are challenges for CS.

REFERENCES

Each of the following references (and associated appendices and/or supplements) is expressly incorporated herein by reference in its entirety:

[1] D. L. Donoho, "Compressed sensing," *IEEE Transactions on Information Theory*, vol. 52, no. 4, pp. 1289-1306, 2006.

[2] J. Zhang, D. Zhao, C. Zhao, R. Xiong, S. Ma, and W. Gao, "Image compressive sensing recovery via collaborative sparsity," *IEEE Journal on Emerging and Selected Topics in Circuits and Systems*, vol. 2, no. 3, pp. 380-391, 2012.

[3] J. Zhang, C. Zhao, D. Zhao, and W. Gao, "Image compressive sensing recovery using adaptively learned sparsifying basis via 10 minimization," *Signal Processing*, vol. 103, pp. 114-126, 2014.

[4] M. E. Ahsen and M. Vidyasagar, "Error bounds for compressed sensing algorithms with group sparsity: A unified approach," *Applied and Computational Harmonic Analysis*, vol. 43, no. 2, pp. 212-232, 2017.

[5] K. Kulkarni, S. Lohit, P. Turaga, R. Kerviche, and A. Ashok, "Reconnet: Non-iterative reconstruction of images from compressively sensed measurements," in *Proceedings of the IEEE Conference on Computer Vision and Pattern Recognition*, 2016, pp. 449-458.

[6] C. A. Metzler, A. Mousavi, and R. G. Baraniuk, "Learned d-amp: Principled! neural network based compressive

[7] W. Shi, F. Jiang, S. Zhang, and D. Zhao, "Deep networks for compressed image sensing," in *Proceedings of the IEEE International Conference on Multimedia and Expo,* 2017, pp. 877-882.

[8] J. Zhang and B. Ghanem, "Ista-net: Interpretable optimization-inspired deep network for image compressive sensing," in *Proceedings of the IEEE Conference on Computer Vision and Pattern Recognition,* 2018, pp. 1828-1837.

[9] Y. Yang, J. Sun, H. Li, and Z. Xu, "Admm-csnet: A deep learning approach for image compressive sensing," *IEEE Transactions on Pattern Analysis and Machine Intelligence,* vol. 42, no. 3, pp. 521-538, 2018.

[10] M. Kabkab, P. Samangouei, and R. Chellappa, "Task-aware compressed sensing with generative adversarial networks," in *Proceedings of the AAAI Conference on Artificial Intelligence,* vol. 32, no. 1, 2018.

[11] W. Shi, F. Jiang, S. Liu, and D. Zhao, "Image compressed sensing using convolutional neural network," *IEEE Transactions on Image Processing,* vol. 29, pp. 375-388, 2020.

[12] J. Zhang, C. Zhao, and W. Gao, "Optimization-inspired compact deep compressive sensing," *IEEE Journal of Selected Topics in Signal Processing,* vol. 14, no. 4, pp. 765-774, 2020.

[13] Z. Zhang, Y. Liu, J. Liu, F. Wen, and C. Zhu, "Amp-net: Denoising-based deep unfolding for compressive image sensing," *IEEE Transactions on Image Processing,* vol. 30, pp. 1487-1500, 2020.

[14] D. You, J. Zhang, J. Xie, B. Chen, and S. Ma, "Coast: Controllable arbitrary-sampling network for compressive sensing," *IEEE Transactions on Image Processing,* vol. 30, pp. 6066-6080, 2021.

[15] D. You, J. Xie, and J. Zhang, "Ista-net++: Flexible deep unfolding network for compressive sensing," in *Proceedings of the IEEE International Conference on Multimedia and Expo,* 2021, pp. 1-6.

[16] Y. Sun, J. Chen, Q. Liu, and G. Liu, "Learning image compressed sensing with sub-pixel convolutional generative adversarial network," *Pattern Recognition,* vol. 98, p. 107051, 2020.

[17] J. Chen, Y. Sun, Q. Liu, and R. Huang, "Learning memory augmented cascading network for compressed sensing of images," in *Proceedings of the European Conference on Computer Vision,* 2020, pp. 513-529.

[18] Y. Sun, Y. Yang, Q. Liu, J. Chen, X.-T. Yuan, and G. Guo, "Learning non-locally regularized compressed sensing network with half-quadratic splitting," *IEEE Transactions on Multimedia,* vol. 22, no. 12, pp. 3236-3248, 2020.

[19] A. Bora, A. Jalal, E. Price, and A. G. Dimakis, "Compressed sensing using generative models," in *Proceedings of the International Conference on Machine Learning,* 2017, pp. 537-546.

[20] A. Mousavi, G. Dasarathy, and R. G. Baraniuk, "Deepcodec: Adaptive sensing and recovery via deep convolutional neural networks," *arXiv preprint arXiv:1707.03386,* 2017.

[21] K. Xu, Z. Zhang, and F. Ren, "Lapran: A scalable laplacian pyramid reconstructive adversarial network for flexible compressive sensing reconstruction," in *Proceedings of the European Conference on Computer Vision,* 2018, pp. 485-500.

[22] Y. Wu, M. Rosca, and T. Lillicrap, "Deep compressed sensing," in *Proceedings of the International Conference on Machine Learning.* PMLR, 2019, pp. 6850-6860.

[23] Y. Sun, J. Chen, Q. Liu, B. Liu, and G. Guo, "Dual-path attention network for compressed sensing image reconstruction," *IEEE Transactions on Image Processing,* vol. 29, pp. 9482-9495, 2020.

[24] H. Yao, F. Dai, S. Zhang, Y. Zhang, Q. Tian, and C. Xu, "Dr2-net: Deep residual reconstruction network for image compressive sensing," *Neurocomputing,* vol. 359, pp. 483-493, 2019.

[25] A. Vaswani, N. Shazeer, N. Parmar, J. Uszkoreit, L. Jones, A. N. Gomez, L. Kaiser, and I. Polosukhin, "Attention is all you need," in *Proceedings of the Advances in Neural Information Processing Systems,* 2017, pp. 5998-6008.

[26] A. Dosovitskiy, L. Beyer, A. Kolesnikov, D. Weissenborn, X. Zhai, T. Unterthiner, M. Dehghani, M. Minderer, G. Heigold, S. Gelly, J. Uszkoreit, and N. Houlsby, "An image is worth 16×16 words: Transformers for image recognition at scale," in *Proceedings of the International Conference on Learning Representations,* 2021.

[27] H. Chen, Y. Wang, T. Guo, C. Xu, Y. Deng, Z. Liu, S. Ma, C. Xu, C. Xu, and W. Gao, "Pre-trained image processing transformer," in *Proceedings of the IEEE Conference on Computer Vision and Pattern Recognition,* 2021, pp. 12299-12310.

[28] Z. Wang, X. Cun, J. Bao, W. Zhou, J. Liu, and H. Li, "Uformer: A general u-shaped transformer for image restoration," in *Proceedings of the IEEE Conference on Computer Vision and Pattern Recognition,* 2022, pp. 17683-17693.

[29] Y. Jiang, S. Chang, and Z. Wang, "Transgan: Two pure transformers can make one strong gan, and that can scale up," vol. 34, 2021.

[30] J. You, T. Ebrahimi, and A. Perkis, "Attention driven foveated video quality assessment," *IEEE Transactions on Image Processing,* vol. 23, no. 1, pp. 200-213, 2014.

[31] T. Chen, H. Liu, Z. Ma, Q. Shen, X. Cao, and Y. Wang, "End-to-end learnt image compression via non-local attention optimization and improved context modeling," *IEEE Transactions on Image Processing,* vol. 30, pp. 3179-3191, 2021.

[32] K. Han, Y. Wang, H. Chen, X. Chen, J. Guo, Z. Liu, Y. Tang, A. Xiao, C. Xu, Y. Xu, Z. Yang, Y. Zhang, and D. Tao, "A survey on vision transformer," *IEEE Transactions on Pattern Analysis and Machine Intelligence,* pp. 1-1, 2022.

[33] S. S. Chen, D. L. Donoho, and M. A. Saunders, "Atomic decomposition by basis pursuit," *SIAM review,* vol. 43, no. 1, pp. 129-159, 2001.

[34] R. Tibshirani, "Regression shrinkage and selection via the lasso," *Journal of the Royal Statistical Society: Series B (Methodological),* vol. 58, no. 1, pp. 267-288, 1996.

[35] A. Beck and M. Teboulle, "A fast iterative shrinkage-thresholding algorithm for linear inverse problems," *SIAM Journal on Imaging Sciences,* vol. 2, no. 1, pp. 183-202, 2009.

[36] M. V. Afonso, J. M. Bioucas-Dias, and M. A. Figueiredo, "An augmented lagrangian approach to the constrained optimization formulation of imaging inverse problems," *IEEE Transactions on Image Processing,* vol. 20, no. 3, pp. 681-695, 2010.

[37] C. Li, W. Yin, H. Jiang, and Y. Zhang, "An efficient augmented lagrangian method with applications to total variation minimization," *Computational Optimization and Applications,* vol. 56, no. 3, pp. 507-530, 2013.

[38] C. A. Metzler, A. Maleki, and R. G. Baraniuk, "From denoising to compressed sensing," *IEEE Transactions on Information Theory*, vol. 62, no. 9, pp. 5117-5144, 2016.

[39] D. L. Donoho, A. Maleki, and A. Montanari, "Message-passing algorithms for compressed sensing," *Proceedings of the National Academy of Sciences*, vol. 106, no. 45, pp. 18914-18919, 2009.

[40] M. Mardani, E. Gong, J. Y. Cheng, S. Vasanawala, G. Zaharchuk, M. Alley, N. Thakur, S. Han, W. Dally, J. M. Pauly et al., "Deep generative adversarial networks for compressed sensing automates mri," *arXiv preprint arXiv*: 1706.00051, 2017.

[41] A. Radford, L. Metz, and S. Chintala, "Unsupervised representation learning with deep convolutional generative adversarial networks," in *Proceedings of the International Conference on Learning Representations*, 2016.

[42] X. Wang, R. Girshick, A. Gupta, and K. He, "Non-local neural networks," in *Proceedings of the IEEE conference on Computer Vision and Pattern Recognition*, 2018, pp. 7794-7803.

[43] Z. Liu, Y. Lin, Y. Cao, H. Hu, Y. Wei, Z. Zhang, S. Lin, and B. Guo, "Swin transformer: Hierarchical vision transformer using shifted windows," in *Proceedings of the IEEE International Conference on Computer Vision*, 2021, pp. 10012-10022.

[44] I. Goodfellow, J. Pouget-Abadie, M. Mirza, B. Xu, D. Warde-Farley, S. Ozair, A. Courville, and Y. Bengio, "Generative adversarial nets," in *Proceedings of the Advances in Neural Information Processing Systems*, 2014, pp. 2672-2680

[45] Z. Ni, W. Yang, S. Wang, L. Ma, and S. Kwong, "Unpaired image enhancement with quality-attention generative adversarial network," in *Proceedings of the ACM International Conference on Multimedia*, 2020, pp. 1697-1705.

[46] Z. Ni, W. Yang, S. Wang, L. Ma, and S. Kwong, "Towards unsupervised deep image enhancement with generative adversarial network," *IEEE Transactions on Image Processing*, vol. 29, pp. 9140-9151, 2020.

[47] Y. Xie, J. Zhang, C. Shen, and Y. Xia, "Cotr: Efficiently bridging cnn and transformer for 3d medical image segmentation," in *Proceedings of the International conference on medical image computing and computer-assisted intervention*, 2021.

[48] Z. Dai, H. Liu, Q. V. Le, and M. Tan, "Coatnet: Marrying convolution and attention for all data sizes," in *Proceedings of the Advances in Neural Information Processing Systems*, vol. 34, 2021, pp. 3965-3977.

[49] Z. Peng, W. Huang, S. Gu, L. Xie, Y. Wang, J. Jiao, and Q. Ye, "Conformer: Local features coupling global representations for visual recognition," in *Proceedings of the IEEE International Conference on Computer Vision*, 2021, pp. 367-376.

[50] S. d'Ascoli, H. Touvron, M. L. Leavitt, A. S. Morcos, G. Biroli, and L. Sagun, "Convit: Improving vision transformers with soft convolutional inductive biases," in *Proceedings of the International Conference on Machine Learning*, 2021, pp. 2286-2296.

[51] T. Xiao, M. Singh, E. Mintun, T. Darrell, P. Dollar, and R. B. Girshick, "Early convolutions help transformers see better," in' *Proceedings of the Advances in Neural Information Processing Systems*, 2021.

[52] M. Raghu, T. Unterthiner, S. Kornblith, C. Zhang, and A. Dosovitskiy, "Do vision transformers see like convolutional neural networks?" in *Proceedings of the Advances in Neural Information Processing Systems*, 2021.

[53] D. Martin, C. Fowlkes, D. Tal, and J. Malik, "A database of human segmented natural images and its application to evaluating segmentation algorithms and measuring ecological statistics," in *Proceedings of the IEEE International Conference on Computer Vision*, vol. 2, 2001, pp. 416-423.

[54] M. Bevilacqua, A. Roumy, C. Guillemot, and M.-L. A. Morel, "Low-complexity single-image super-resolution based on nonnegative neighbor embedding," in *Proceedings of the British Machine Vision Conference*, 2012, pp. 1-10.

[55] R. Zeyde, M. Elad, and M. Protter, "On single image scale-up using sparse-representations," in *Proceedings of the International Conference on Curves and Surfaces*, 2010, pp. 711-730.

[56] J.-B. Huang, A. Singh, and N. Ahuja, "Single image super-resolution from transformed self-exemplars," in *Proceedings of the IEEE Conference on Computer Vision and Pattern Recognition*, 2015, pp. 5197-5206.

[57] Z. Ni, H. Zeng, L. Ma, J. Hou, J. Chen, and K.-K. Ma, "A gabor feature-based quality assessment model for the screen content images," *IEEE Transactions on Image Processing*, vol. 27, no. 9, pp. 4516-4528, 2018.

[58] P. Arbelaez, M. Maire, C. Fowlkes, and J. Malik, "Contour detection and hierarchical image segmentation," *IEEE Transactions on Pattern Analysis and Machine Intelligence*, vol. 33, no. 5, pp. 898-916, 2010.

[59] K. G. Derpanis and R. Wildes, "Spacetime texture representation and recognition based on a spatiotemporal orientation analysis," *IEEE Transactions on Pattern Analysis and Machine Intelligence*, vol. 34, no. 6, pp. 1193-1205, 2011.

[60] P. Saisan, G. Doretto, Y. N. Wu, and S. Soatto, "Dynamic texture recognition," in *Proceedings of the IEEE Conference on Computer Vision and Pattern Recognition*, vol. 2, 2001, pp. II-II.

[61] R. Peteri, S. Fazekas, and M. J. Huiskes, "Dyntex: A comprehensive database of dynamic textures," *Pattern Recognition Letters*, vol. 31, no. 12, pp. 1627-1632, 2010.

[62] I. Hadji and R. P. Wildes, "A new large scale dynamic texture dataset with application to convnet understanding," in *Proceedings of the European Conference on Computer Vision*, 2018, pp. 320-335.

[63] Y. Fang, H. Zhu, K. Ma, Z. Wang, and S. Li, "Perceptual evaluation for multi-exposure image fusion of dynamic scenes," *IEEE Transactions on Image Processing*, vol. 29, no. 1, pp. 1127-1138, 2020.

[64] S. Kornblith, M. Norouzi, H. Lee, and G. Hinton, "Similarity of neural network representations revisited," in *Proceedings of the International Conference on Machine Learning*, 2019, pp. 3519-3529.

SUMMARY OF INVENTION

Accordingly, the present invention, in one aspect, is a method for adaptive reconstruction of a compressively sensed data. The method contains the steps of receiving sensed data; conducting an initial reconstruction to the sensed data to obtain a plurality of first reconstruction patches; by a reconstruction module, conducting a progressive reconstruction to the sensed data to obtain a plurality of second reconstruction patches; summing the plurality of second reconstruction patches with the a plurality of first reconstruction patches to obtain final patches; and merging the final patches to obtain a reconstructed data. The progressive reconstruction further contains concatenating transformer features and convolution features to obtain the second reconstruction patches.

In some embodiments, the reconstruction module includes a Convolutional Neural CNN stem for producing the convolution features, and a transformer stem for producing the transformer features.

In some embodiments, the transformer stem contains a first transformer block and a second transformer block. The CNN stem includes a first convolution block corresponding to the first transformer block, and a second convolution block corresponding to the second transformer block. The step of conducting a progressive reconstruction to the sensed data further includes the steps of generating a first transformer feature of the transformer features at the first transformer block based on the sensed data and an output of the first convolution block; and generating a second transformer feature of the transformer features at the second transformer block based on the first transformer feature and an output of the second convolution block.

In some embodiments, at least one of the first and second convolution blocks contain a plurality of convolution layers, followed by a leaky rectified linear unit (ReLU) and a batch norm layer.

In some embodiments, at least one of the first and second transformer blocks is a window-based transformer.

In some embodiments, at least one of the first and second transformer blocks includes a multi-head self-attention (MSA) module, followed by a multi-layer perceptron (MLP) module.

In some embodiments, the reconstruction module further contains an input projection module before the CNN stem and the transformer stem. The step of conducting a progressive reconstruction to the sensed data further includes a step of increasing a dimension of the sensed data inputted to the reconstruction module by the input projection module.

In some embodiments, the input projection module contains s a plurality of 1×1 convolution layers and a sub-pixel convolution layer.

In some embodiments, the reconstruction module further contains an output projection module after the transformer stem. The step of conducting a progressive reconstruction to the sensed data further contains a step of projecting the transformer features into a single channel to obtain the plurality of second reconstruction patches.

In some embodiments, the output projection module contains a plurality of convolution layers followed by a tanh action function.

In some embodiments, the step of conducting an initial reconstruction is performed on a linear initialization module.

In some embodiments, the linear initialization module contains a 1×1 convolution layer and a sub-pixel convolution layer.

In some embodiments, the sensed data contains a plurality of input convolutional patches.

According to another aspect of the invention, there is provided an apparatus for adaptive reconstruction of a compressively sensed data. The apparatus contains one or more processors; and a memory storing computer-executable instructions that, when executed, cause the one or more processors to: receive a sensed data; conduct an initial reconstruction to the sensed data to obtain a plurality of first reconstruction patches; conduct a progressive reconstruction to the sensed data to obtain a plurality of second reconstruction patches; sum the plurality of second reconstruction patches with the a plurality of first reconstruction patches to obtain final patches; and merge the final patches to obtain a reconstructed data. The progressive reconstruction further contains concatenating transformer features and convolution features to obtain the second reconstruction patches.

According to a further aspect of the invention, there is provided a non-transitory computer readable medium including executable instructions that, when executed by at least one processor, direct the at least one processor to perform a method. The method contains the steps of receiving a sensed data; conducting an initial reconstruction to the sensed data to obtain a plurality of first reconstruction patches; by a reconstruction module, conducting a progressive reconstruction to the sensed data to obtain a plurality of second reconstruction patches; summing the plurality of second reconstruction patches with the a plurality of first reconstruction patches to obtain final patches; and merging the final patches to obtain a reconstructed data. The progressive reconstruction further includes concatenating transformer features and convolution features to obtain the second reconstruction patches.

One can see that exemplary embodiments of the invention provide a hybrid network for adaptive sampling and reconstruction of CS, which integrates the advantages of leveraging both detailed spatial information from CNN and the global context provided by transformer for enhanced representation learning. The dual-branches structure is concurrent, and the local features and global representations are fused under different resolutions to maximize the complementary of features. Such a hybrid network demonstrates the effectiveness of the dedicated transformer-based architecture for CS.

The foregoing summary is neither intended to define the invention of the application, which is measured by the claims, nor is it intended to be limiting as to the scope of the invention in any way.

BRIEF DESCRIPTION OF FIGURES

The foregoing and further features of the present invention will be apparent from the following description of embodiments which are provided by way of example only in connection with the accompanying figures, of which:

FIG. 4 depicts visual quality comparison of various CS methods. The CS ratios from top to bottom row are 1%, 10%, and 50%, respectively.

Figure 1:
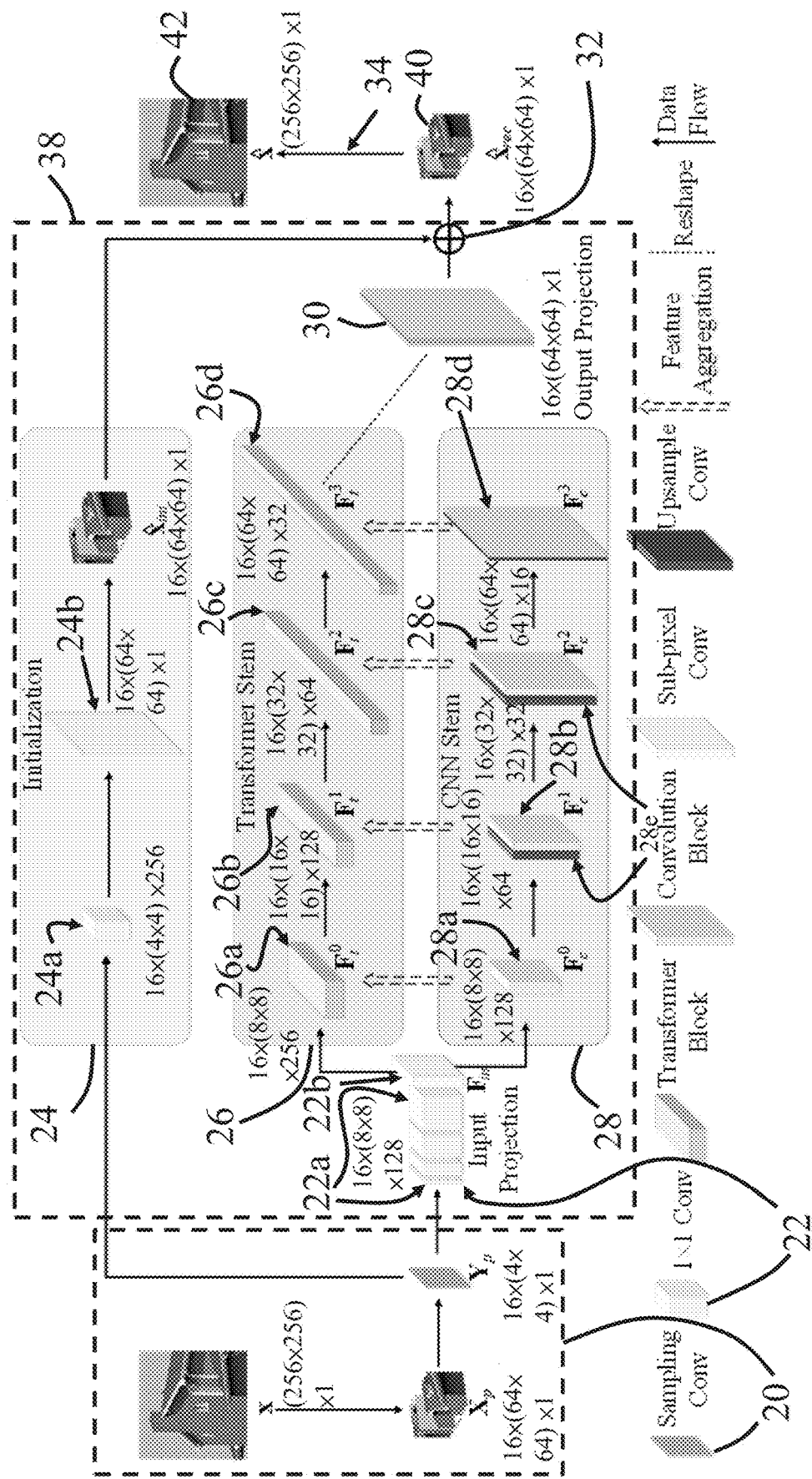
FIG. 1 is an illustration of the pipeline of CSformer at CS ratio of 25%, according to a first embodiment of the invention. For the operators in the figure, the corresponding label indicates the output.

Within each dataset, the sampling ratios from left to right are 1%, 4%, 10%, 25%, and 50%, respectively.

In the drawings, like numerals indicate like parts throughout the several embodiments described herein.

DETAILED DESCRIPTION

CS reconstruction methods can be classified into two categories: iterative optimization based conventional methods and data-driven based DL methods. Furthermore, deep-network based approaches can be divided into deep unfolding methods and deep feedforward methods. Iterative optimization based conventional methods mainly rely on sparsity priors to recover the signal from the under-sampled measurements. Some approaches obtain the reconstruction by linear programming based on $L_1$ minimization. Examples of such algorithms involve basis pursuit (BP) [33], least absolute shrinkage and selection operator (LASSO) [34], the iterative shrinkage/thresholding algorithm (ISTA) [35], and the alternating direction method of multipliers (ADMM). In addition, some works improve the recovery performance by exploring image priors [37], [38]. In general, the conventional CS reconstruction methods usually require hundreds of iterations to solve the optimization problem. The requirement of iterative computation leads to high computational complexity and lets many conventional methods take several seconds to several minutes to reconstruct a high-quality image [11].

Deep neural networks have been developed for image CS in the last few years. Deep unfolding methods incorporate the traditional iterative reconstruction and the deep neural networks. Such methods map each iteration into a network layer that preserves the interpretability and performance. Inspired by the D-AMP [39], Metzler et al. [6] implement a learned D-AMP (LDAMP) using a denoising CNN. AMP-Net [13] also applies denoising prior with an additional deblocking module and uses a learned sampling matrix. Moreover, ISTA-Net+ [8] and ISTA-Net++ [15] design the deep network to mimic the ISTA algorithm for CS reconstruction. OPINE-Net [12] can also be regarded as a variant of ISTA-Net+, except that OPINE-Net simultaneously explores adaptive sampling and recovery. The main drawback of the unfolding approaches is the limitation of parallel training and hardware acceleration owing to its sophisticated and iterative structure.

Instead of specific priors, the deep feedforward methods directly impose the modeling power of DL free from any constraints. ReconNet [5] aims to recover the image from CS measurements via CNN. The reconstruction quality and computational complexity are both superior to traditional iterative algorithms. Instead of fixing sampling matrix, DeepCodec [20] learns a transformation from signals to measurement vectors and reconstructs the measurements to signals using a deep convolutional network. Shi et al. [7], [11] implement a convolution layer to replace it and propose a deep network to recover the image named CSNet. In [16], Sun et al. design a 3-D encoder and decoder with the channel attention motivated skip links and introduce the non-local regularization for exploring the long-range dependencies. Sun et al. [23] propose a dual-path attention network dubbed DPA-Net for CS reconstruction. Two path networks are embedded in the DPA-Net for learning structure and texture, respectively, and then combined by the attention module. In addition, some methods adopt generative adversarial network (GAN) for CS [10], [16], [19], [21], [40]. Bora et al. utilize a pre-trained deep convolution GAN (DCGAN) [41] as the generator and discriminator for CS reconstruction. The authors of [10] propose a task-aware GAN model, which shows that the task awareness helps to improve performance. Sun et al. [16] introduce a novel sub-pixel GAN for learning CS reconstruction of images.

The original transformer [25] is designed for natural language processing (NLP), in which the multi-head self-attention and feedforward multi-layer perceptron (MLP) layer excel at handling long-range dependencies of sequence data. The self-attention for NLP can be conceived as a form of non-local filtering [42] operation that is applicable in computer vision. Inspired by the power of transformer in NLP, the pioneering work of VIT [26] splits an image into 16×16 flattered patches, successfully extending the transformer to image classification task. Swin transformer [43] designs a hierarchical transformer architecture with the shifted window-based multi-head attentions to reduce the computation cost. Since then, transformer has vaulted into a model on a par with CNN, and the transformer-based application of computer vision has mushroomed. Uformer [28] borrows from the structure of U-Net to build transformer to further improve the performance for low-level vision tasks. TransGAN proposes a GAN [44]-[46] architecture using pure transformer for image generation. On the other hand, many works aim to combine the strengths from the CNN and transformer effectively [47]-[50].

Referring now to FIG. 1, a first embodiment of the invention is a hybrid network for adaptive sampling and reconstruction of CS, which integrates the advantages of leveraging both detailed spatial information from CNN and the global context provided by transformer for enhanced representation learning. In FIG. 1, the network architecture is at CS ratio of 25%. The hybrid framework in FIG. 1, which is termed CSformer, is configured for end-to-end compressive image sensing. The network contains a sampling module 20, an input projection module 22, a linear initialization module 24, a transformer stem 26, a CNN stem 28, an output projection module 30, a summing module 32, and a merging module 34. The input projection module 22, the linear initialization module 24, the transformer stem 26, the CNN stem 28, and the output projection module 30 are part of a reconstruction module 38. The sampling module 20 as an input of the network is adapted to receive a raw data, which in this embodiment is an image x. The output of the sampling module 20 is final total CS measurements, also referred to as sensed data in this embodiment. The sensed data can be communicated over a communication network (not shown) from the sampling module 20 to the reconstruction module 38, where the communication network can be one or more of an intranet, a Wide Area Network (WAN), a Local Area Network (LAN), the Internet, and other forms of data transmission medium.

The reconstruction module 38 contains three branches which are concurrent, namely the linear initialization module 24, the transformer stem 26 and the CNN stem 28. This means that the sensed data received by the reconstruction module 38 are fed to the linear initialization module 24, the transformer stem 26 and the CNN stem 28 in parallel. The transformer stem 26 is connected to the output projection module 30, where the output projection module 30 is used to project transformer features to the image space. At the summing module 32, outputs from the output projection module 30 and outputs from the linear initialization module 24 are summed up to obtain final patches 40, and the final patches 40 are merged at the merging module 34 to obtain a final reconstructed image 42. Details of each of the components/modules in the network and their working principles will now be described.

The sampling module 20 is applied to sample block by block in the image patches, which are split from the image x via a non-overlapping way. The split image patches can be denoted as $X_p=\{x_1, x_2, \ldots, x_i\}$. The sampling matrix is replaced by the learned convolution kernels in each patch. Then, the corresponding measurements can be expressed as $Y_p=\{y_1, y_2, \ldots, y_i\}$. In particular, suppose that $x_i \in \mathbb{R}^{H_p \times W_p \times 1}$ is the patch i of input whole image $x \in \mathbb{R}^{H \times W \times 1}$. The sampling operation takes place in patch $x_i$. The block-based CS (BCS) is processed in patch $x_i$, which decomposes a patch into B×B non-overlapping blocks. Then the number of blocks is $$\frac{H_p}{B} \times \frac{W_p}{B}.$$

Figure 2:
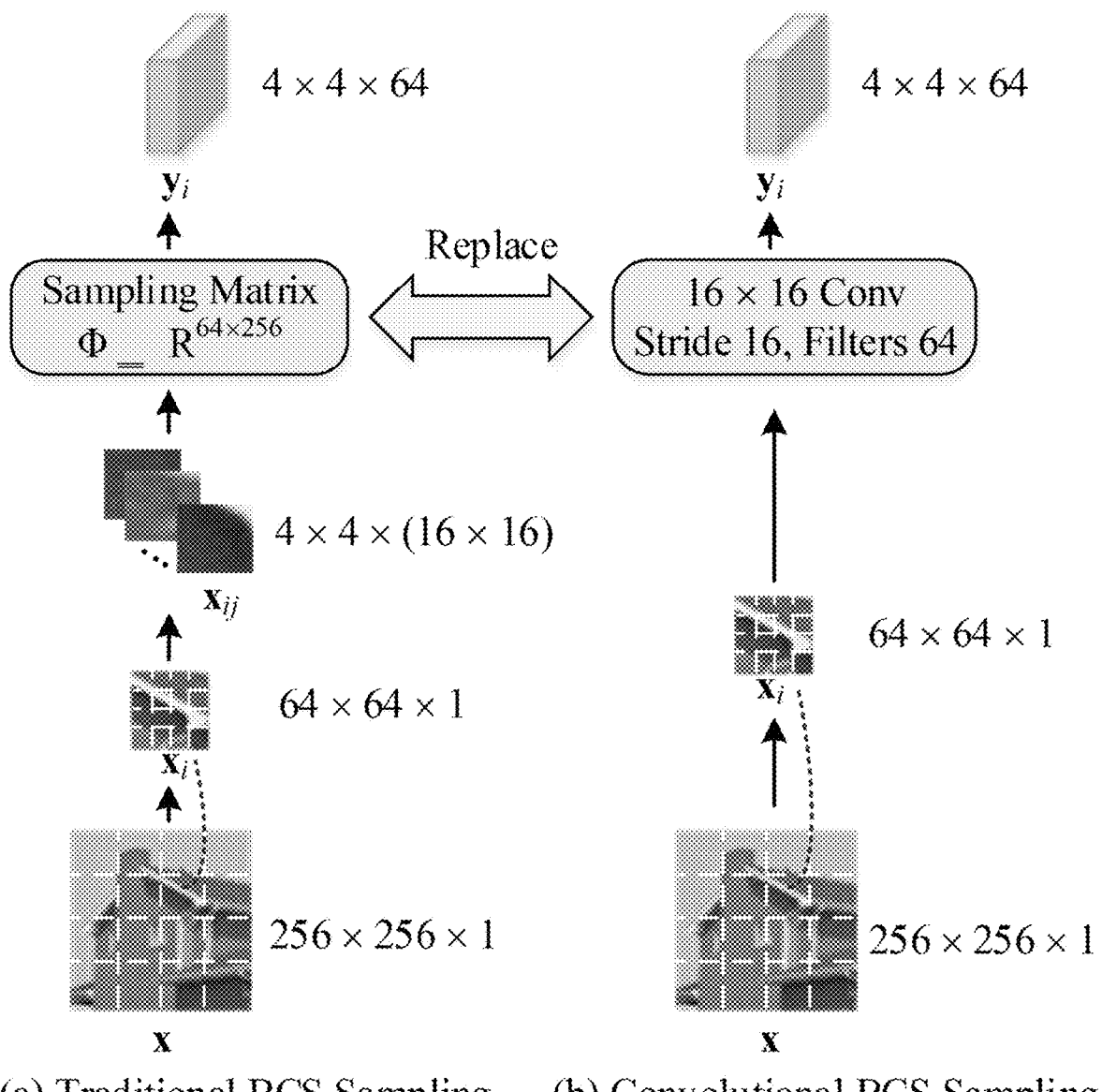
FIG. 2 is an illustration of the details of sampling at CS ratio of 25% for CSformer in FIG. 1, showing that the traditional BCS sampling can be equivalently replaced by a convolution.

Each block is vectorized and subsequently sampled by the measurements matrix $\Phi$. Suppose that $x_{ij}$ is the block j of input patch $x_i$. The corresponding measurements $y_{ij}$ is obtained by $y_{ij}=\Phi x_{ij}$, where $\Phi \in \mathbb{R}^{m \times B^2}$ and $$\frac{m}{B^2}$$

represents the sampling ratio. Then the measurements $$y_i \in \mathbb{R}^{\frac{H_p}{B} \times \frac{W_p}{B} \times m}$$

of the input patch $x_i$ is obtained by stacking each block. In this embodiment, the sampling process is replaced by the convolution operation with appropriately sized filters and stride, as shown in FIG. 2. The sampling convolution can be formulated as $y_{ij}=W_B \otimes x_{ij}$, where $W_B$ corresponds to a convolution layer without bias consisting of m filters with B×B size, and the stride equals to B. After applying the convolution operation on the patch $x_i$, one can obtain the final total CS measurements $y_i$. As shown in the example of FIG. 2, the CS measurements $y_i$ of size 4×4×64 can be acquired from an input patch $x_i$ of size 64×64 with sampling ratio 25% by exploiting a convolution layer using 64 filters of kernel size 16×16, stride=16. In this case, $H_p=W_p=64$, B=16 and m=64. In fact, the adoption of the learned convolutional kernel instead of sampling matrix can efficiently utilize the characteristic of the image, and make the output measurements more easily be used in the following reconstruction module 38.

The linear initialization module 24 including two consecutive operations at respectively a 1×1 convolution layer 24a followed by a sub-pixel convolution layer 24b with 16× upsample ratio to obtain the initial reconstruction $\hat{x}_{ini}$. The linear initialization module 24 as the initialization stem mimics traditional reconstruction of compressive sensing but generates the initial reconstruction in a learnable and efficient manner. Given the CS measurements, traditional BCS usually obtain the initial reconstructed block by $\hat{x}_{ij}=\Phi^\dagger y_{ij}$, where $\hat{x}_{ij}$ is the reconstruction of $x_{ij}$, and $\Phi^\dagger \in \mathbb{R}^{B^2 \times m}$ is the pseudo-inverse matrix of $\Phi$. In this embodiment, the initialization process utilizes the 1×1×m convolution to replace $\Phi^\dagger$. The difference is that one can directly implement the convolution layer 24a on the $y_i$ to recover the initial patch. The Initialization first adopts $B^2$ filters of kernel size 1×1×m to covert the measurements $y_i$ dimension to $B^2$. Subsequently, the followed sub-pixel convolution layer 24b is employed to obtain the initial reconstruction patches $\hat{x}_i$. For instance, measurements with size 4×4×64 is transformed to the initial reconstruction with size 64×64×1 at CS ratio of 25%. In summary, this embodiment uses the convolution and sub-pixel convolution to obtain each initial reconstruction, which is a more efficient way as the output is directly a tensor instead of a vector.

As shown in FIG. 1, the input projection module 22 is located before both the CNN stem 28 and the transformer stem 26. The sensed data as the measurements are taken as the input of the input projection module that contains several 1×1 convolution layers 22a to gradually increase the dimension, then followed by a sub-pixel convolution layer 22b with 2× upsample ratio to obtain input feature $F_{in}$ with size $H_0 W_0 \times C_0$ (by default it is set that $H_0=W_0=8$). The input feature F in matches the input feature sizes for CNN $H_0 \times W_0 \times C_0$ and transformer $(H_0 \times W_0) \times C_0$.

A trunk recovery network consists of the CNN stem 28 and the transformer stem 26. Each stem contains four blocks with upsample layers to progressively reconstruct features until aligning the patch size. In both branches, convolution features are used to provide local information that complements the features of transformer. The CNN stem 28 is composed of multiple stages. The first stage takes the projected output feature $F_{in}$ from the input projection module 22 as input. Then the feature passes through the first convolution block 28a to obtain feature $F_c^0$ with size $H_0 \times W_0 \times C_0$. Each convolution block 28a-28d is composed of two convolution layers (not shown), followed by a leaky ReLU and a batch norm layer. The kernel size of each convolutional layer is 3×3 with 1 as the padding size, and the output channel is the same as the input channel. Thus, the resolution and channel size are maintained to be consistent after each convolution block 28a-28d. To scale up to a higher-resolution feature, there is added an upsample module 28e before the rest of convolution block (i.e., convolution blocks 28b-28d). The upsample convolution module 28e first adopts bicubic upsample to upscale the resolution of the previous feature, and then a 1×1 convolutional layer (not shown) is used to reduce the dimension to a half. Thus, the output features of CNN stem 28 can be represented by $F_c^i \in \mathbb{R}^{H_i \times W_i \times C_i}$, where $$H_i = 2^i \times H_0, \; W_i = 2^i \times W_0, \; C_i = \frac{C_0}{2^i}, \; i \geq 0.$$

Figure 3:
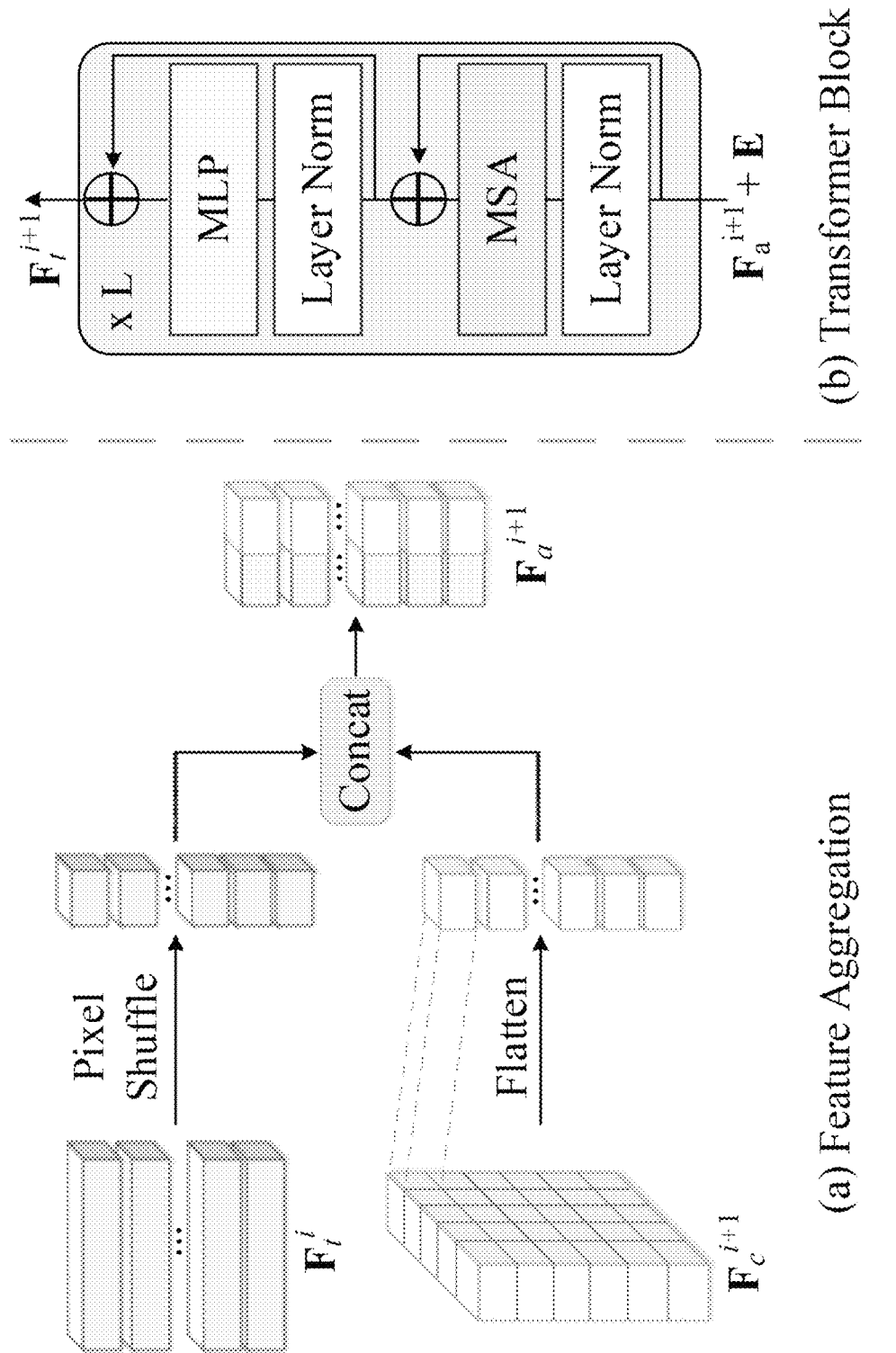
FIG. 3. is an illustration of the implementation details of the transformer stem in CSformer of FIG. 1.

Turning to the transformer stem 26. The transformer stem 26 aims to provide further guidance for global restoration with progressive features according to the convolution features. There are four transformer blocks 26a-26d in the transformer stem 26 as shown in FIG. 1. Each of the transformer blocks 26a-26d correspond to their respective counterpart among the convolution blocks 28a-28d. As shown in part (b) in FIG. 3, each transformer block 26a-26d stacks L transformer network. Part (a) in FIG. 3 shows feature aggregation by concatenating the transformer feature $F_t^i$ and CNN feature $F_c^{i+1}$. The input of each transformer block 26a-26d is the aggregation feature that bridges the convolution features and transformer features. The aggregation feature fuses the local features from the CNN and the global features from the transformer via a concatenation way. The feature dimension of the CNN stem 28 and transformer stem 26 is inconsistent, such that there is a need to reshape the CNN features to align with the transformer features. The 2D feature map of CNN with size $H_i \times$ $W_i \times C_i$ needs to be flattened to a 1D sequence $(H_i \times W_i) \times C_i$ for transformer. As can be seen from FIG. 3, the aggregation feature is taken as the input to the transformer blocks by concatenating these two features. It is worth mentioning that the input aggregation feature $F_a^0$ of the first transformer block 26a is concatenated by $F_{in}$ and $F_c^0$ as shown in FIG. 1. In this way, the first transformer block 26a makes full use of the information in the measurements and introduces local features of CNN.

After the first transformer block 26a, the transformer feature $F_t^0$ with size $(H_0 \times W_0) \times 2C_0$ is obtained. The misalignment between the transformer feature with next stage CNN features is further eliminated. Firstly, the 1D sequence of $F_t^0$ is reshaped to 2D feature map with the size $H_0 \times W_0 \times 2C_0$. Subsequently, a sub-pixel convolution layer (not shown) is used to upsample the resolution by 2× ratio and reduce the channel dimension to a quarter of the input. Alignment of the spatial dimension and channel dimension between transformer features and CNN features are completed. Then the aggregation feature is obtained by concatenating the transformer feature and CNN feature. The aggregation feature can be expressed by $F_a^j \in \mathbb{R}^{(H_j \times W_j)C_j}$, where $$H_j = 2^j \times H_0, \ W_j = 2^j \times W_0, \ C_j = \frac{2C_0}{2^j}, j \geq 0.$$

It can be seen from FIGS. 1 and 3 that the second aggregation feature $F_a^1$ of the second transformer block 26b is concatenated by $F_t^0$ and $F_c^1$, and after the second transformer block 26b, the transformer feature $F_t^1$ is obtained. The third aggregation feature $F_a^2$ of the third transformer block 26c is concatenated by $F_t^1$ and $F_c^2$, and after the third transformer block 26c, the transformer feature $F_t^2$ is obtained. The fourth aggregation feature $F_a^3$ of the fourth transformer block 26d is concatenated by $F_t^2$ and $F_c^3$, and after the fourth transformer block 26d, the transformer feature $F_t^3$ is obtained. The transformer feature $F_t^3$ is the output of the transformer stem 26 (and also that of the CNN stem 28) which is then fed to the output projection module 30.

The standard transformer takes a series of sequences (tokens) as input and computes self-attention globally between all tokens. However, if each pixel is taken as one token in transformer for CS reconstruction, the sequences grow as the resolution increases, resulting in explosive computational complexity for larger resolution. For instance, even a 32×32 image will lead to 1024 sequences and have $1024^2$ cost of self-attention. To address the above issue, the method in this embodiment performs a window-based transformer. Given an input fusion feature $F_a^j \in \mathbb{R}^{(H_j \times W_j)C_j}$ of transformer, one first adds the $F_a^j$ with the learnable positional encoding $E \in \mathbb{R}^{(H_j \times W_j)C_j}$. Then the feature is partitioned into P×P non-overlapping windows. The feature is split into the size $$\frac{H_j W_j}{P^2} \times P^2 \times C_j,$$

where $$\frac{H_j W_j}{P^2}$$

is the total number of windows. The multi-head self-attention is computed in each $P^2$ window. In each window, the feature $$F_t^{win} \in R^{P^2 \times \frac{C_j}{h}}$$

is computed by the self-attention, where h is the number of heads in the multi-head self attention. First, the query, key, and value matrices are computed as:

$$Q = F_t^{win} \times W_Q, K = F_t^{win} \times W_K, V = F_t^{win} \times W_V, \quad (1)$$

where $W_Q$, $W_K$ and $W_v$ are the projection matrices with the size $C_j/h \times d$. Subsequently, the self-attention can be formulated by:

$$O(F_t^{win}) = \left(\sigma\left(\frac{QK^T}{\sqrt[4]{d}} + E_r\right)\right)V \quad (2)$$

where $O(\bullet)$ denotes the self-attention operation, $\sigma(\bullet)$ is the softmax function, and $E_r$ is the learnable relative position encoding. The multi-head self-attention is performed for h times self-attention in parallel and concatenates the results to obtain the output. The MSA based on the windows significantly reduces the computational and GPU memory cost.

Then, the output of MSA passes through a MLP consisting of two fully-connected layers with Gaussian error linear unit (GELU) activation for nonlinear transformation. As shown in Part (b) of FIG. 3, the layer norm $\tau(\bullet)$ is inserted before MSA and MLP and the whole transformer process can be formulated as follows, $$F_a^j = F_a^j E,$$

$$F_t^j = \text{MSA}(\tau(F_a^j)) + F_a^j,$$

$$F_t^j = \text{MLP}(\tau(F_t^j)) + F_t^j, \quad (3)$$

After the transformer feature reaches the input resolution $(H_p, W_p)$, the output projection module 30 is used to project the transformer feature to the image space. Before passing through the output projection, the transformer feature is firstly shaped to a 2D feature. Output projection consists of two convolution layers followed by a tanh action function (all not shown), which maps the transformer feature to single channel reconstruction patches. Then, at the summing module 32 the reconstruction patches from the transformer stem 26 are summed up with the initial reconstruction patches from the linear initialization module 24 to obtain the final patches $\hat{x}_{rec}$, which are then all merged up at the merging module 34 to obtain the final reconstructed image $\hat{x}$.

Next the loss function applied in CSformer is briefly described. The parameters of CSformer are optimized by minimizing the mean square error (MSE) between the output reconstructed image $\hat{x}$ and the ground-truth image x as follows, $$\mathcal{L} = |\hat{x} - x|_2^2. \quad (4)$$

It is worth mentioning that the method in this embodiment is based on patch reconstruction while the loss function is computed on the whole image. As such, the blocking artifacts are attenuated without other post-processing deblocking modules.

Having described the structure of the hybrid network and its working principle in FIGS. 1-3, now the descriptions go to training settings and evaluation datasets, followed by the experimental results of the method applied using the hybrid network (hereinafter "proposed method" or "proposed approach") compared with state-of-the-art on different test datasets. Then, there is provided an analysis of the effectiveness of the proposed approach by comparing the results with those of some variants of CSformer. Lastly, a comparison is provided on the computational complexity and running time.

Training vision transformer is known to be data-hungry. Therefore, COCO 2017 unlabeled images dataset is used here for training, which is a large-scale dataset that consists of over 123K images of high diversity. To reduce the training time, it is worth mentioning that only a quarter of the whole training set is used, i.e., around 40K images for training. Moreover, CSformer is also trained on a small dataset with 400 images of BDS400 dataset [53]. The proposed method is evaluated on various widely used benchmark datasets, including Set11 [5], BSD68 [53], Set5 [54], Set14 [55], Urban100 [56]. Set11 and BSD68 datasets are composed of 11 and 68 gray images, respectively. Urban100 dataset contains 100 high-resolution challenging city images. Set5 and Set14 datasets have 5 and 14 images with different resolutions. The luminance components of color images are utilized for both training and testing. The test images are divided into overlapping patches for testing in the real implementation. The reconstruction results are reported under a range of sampling ratios from 1% to 50%. Peak Signal-to-Noise Ratio (PSNR) and Structural Similarity Index (SSIM) are adopted as the evaluation measures.

The training images are cropped into 128×128 images as input, i.e., H=W=128. The size of the fixed patches is $H_p=W_p=64$. The sampling convolutional kernel size in the sampling process is set to be B=16, i.e., 16×16 convolution layer with stride=16. The output feature dimension of input projection $C_0$ is set to 128. The window size of window-based multi-head self-attention is set to be P×P=8×8 for all transformer blocks. Each transformer block stacks L=5 transformer network. One Nvidia 2080Ti card is used for training the model on Pytorch, and the model is optimized by Adam optimizer. The learning rate is initially set as $2\times10^{-4}$ and the cosine decay strategy is adopted to decrease the learning rate to $1\times10^{-6}$. The number of iteration is 50,000, and the training time is about 1.5 days.

Next, experimental results of the method applied using the hybrid network compared with state-of-the-art on different test datasets are presented. To facilitate comparisons, the performance of CSformer is evaluated on five widely used test sets, and comparison is made with four recent representatives DL based CS state-of-the-art methods, including CSNet[+] [11], DPA-Net [23], OPINE-Net and AMP-Net [13]. The results of other methods are obtained by their public pre-trained model.

To display the comprehensive performance comparisons over multiple datasets, two commonly-used average measures are utilized to evaluate the average performance over the five test databases, as suggested in [57]. The two average measures can be defined as follows:

$$\bar{s}=\Sigma_{i=1}^D s_i \cdot \beta_i / \Sigma_{i=1}^D \beta_i, \quad (5)$$

where D denotes the total number of datasets (D=5 in this example), $s_i$ represents the value of the performance index (e.g., PSNR, SSIM) on the i-th dataset, and $\beta_i$ is the corresponding weight on the i-th dataset. The first average measurement is Direct Average with $\beta_i=1$. The second average measurement is Weighted Average, where $\beta_i$ is set as the number of images in the i-th dataset (e.g., 11 for the Set11 dataset, 100 for the Urban100 dataset).

Table I shows the average PSNR and SSIM performance of different methods at different CS ratios across all five datasets. The subscript of CSformer represents the training set used. It can be obviously observed that CSformer achieves both highest PSNR and SSIM results for different ratios on all datasets when training on the COCO dataset. The method of the approach achieves a large gap (1~2 dB) across all CS ratios in Urban100 dataset that contains more images with larger resolution. The Direct Average and Weighted Average show that CSformer outperforms all state-of-the-art models under comparison. Compared to other methods, the proposed method trained on the BSD400 dataset also achieves the best results across the five test datasets at most sampling rates. On the other hand, the performance of $CSformer_{bsd400}$ has some degradation compared to training on the large dataset. This trend is also mentioned in [26], which indicates that transformer may be benefited from a large dataset with sufficient images. Experimental results demonstrate that CSformer has better generalization ability and recovery ability for limit sampling under the premise that all sampling rates can achieve optimal performance.

TABLE I

PSNR/SSIM PERFORMANCE COMPARISON WITH DIFFERENT CS RATIOS ON VARIOUS TEST DATASETS. THE BEST ONE IS SHOWN IN THE LAST COLUMN AND THE SECOND BEST IS SHOWN AS BOLDED

| Dataset | ratio | CSNet | DPA-Net | OPINE-Net | AMP-Net | $CSformer_{bsd400}$ | $CSformer_{coco}$ |
|---|---|---|---|---|---|---|---|
| Set11 | 1% | 21.03/0.5566 | 18.05/0.5011 | 20.15/0.5340 | 20.57/0.5639 | 21.58/0.6075 | 21.95/0.6241 |
| | 4% | — | 23.50/0.7205 | 25.69/0.7920 | 25.26/0.7722 | 26.28/0.8062 | 26.93/0.8251 |
| | 10% | 28.37/0.8580 | 26.99/0.8354 | 29.81/0.8884 | 29.45/0.8787 | 29.79/0.8883 | 30.66/0.9027 |
| | 25% | — | 31.74/0.9238 | 34.86/0.9509 | 34.63/0.9481 | 34.81/0.9527 | 35.46/0.9570 |
| | 50% | 38.52/0.9749 | 36.73/0.9670 | 40.17/0.9797 | 40.34/0.9807 | 40.73/0.9824 | 41.04/0.9831 |
| BSD68 | 1% | 22.36/0.5273 | 18.98/0.4643 | 22.11/0.5140 | 22.28/0.5387 | 22.81/0.5566 | 23.07/0.5591 |
| | 4% | — | 23.27/0.6096 | 25.20/0.6825 | 25.26/0.6760 | 25.73/0.6956 | 25.91/0.7045 |
| | 10% | 27.18/0.7766 | 25.57/0.7267 | 27.82/0.8045 | 27.86/0.7926 | 28.05/0.8045 | 28.28/0.8078 |
| | 25% | — | 29.68/0.8763 | 31.51/0.9061 | 31.74/0.9048 | 31.82/0.9106 | 31.91/0.9102 |
| | 50% | 35.42/0.9614 | 32.89/0.9373 | 36.35/0.9660 | 36.82/0.9680 | 37.14/0.9766 | 37.16/0.9714 |
| Urban100 | 1% | 20.75/0.5204 | 16.36/0.4162 | 19.82/0.5006 | 20.90/0.5328 | 21.57/0.5672 | 21.94/0.5885 |
| | 4% | — | 21.64/0.6498 | 23.36/0.7114 | 24.15/0.7029 | 24.94/0.7396 | 26.13/0.7803 |
| | 10% | 26.52/0.8053 | 25.54/0.7851 | 26.93/0.8397 | 27.38/0.8270 | 27.92/0.8458 | 29.61/0.8762 |
| | 25% | — | 28.81/0.8951 | 31.86/0.9308 | 32.19/0.9258 | 32.43/0.9332 | 34.16/0.9470 |
| | 50% | 35.25/0.9621 | 32.09/0.9454 | 37.23/0.9747 | 37.51/0.9734 | 37.88/0.9766 | 39.46/0.9811 |

TABLE I-continued

PSNR/SSIM PERFORMANCE COMPARISON WITH DIFFERENT CS RATIOS ON VARIOUS TEST DATASETS. THE BEST ONE IS SHOWN IN THE LAST COLUMN AND THE SECOND BEST IS SHOWN AS BOLDED

| Dataset | ratio | CSNet | DPA-Net | OPINE-Net | AMP-Net | CSformer$_{bsd400}$ | CSformer$_{coco}$ |
|---|---|---|---|---|---|---|---|
| Set5 | 1% | 24.18/0.6478 | 19.02/0.5133 | 21.89/0.6101 | 23.48/0.6518 | 24.85/0.7052 | 25.22/0.7197 |
|  | 4% | — | 26.63/0.7767 | 27.95/0.8209 | 29.01/0.8359 | 30.04/0.8593 | 30.31/0.8686 |
|  | 10% | 32.59/0.9062 | 30.32/0.8713 | 32.51/0.9058 | 33.42/0.9140 | 33.90/0.9220 | 34.20/0.9262 |
|  | 25% | — | 33.96/0.9360 | 36.78/0.9510 | 38.03/0.9586 | 38.24/0.9618 | 38.30/0.9619 |
|  | 50% | 41.79/0.9803 | 39.57/0.9716 | 41.62/0.9779 | 42.72/0.9818 | 43.48/0.9840 | 43.55/0.9845 |
| Set14 | 1% | 22.92/0.5630 | 18.30/0.4616 | 21.36/0.5345 | 22.79/0.5751 | 23.56/0.6032 | 23.88/0.6146 |
|  | 4% | — | 23.69/0.6534 | 25.50/0.6974 | 26.67/0.7219 | 27.31/0.7449 | 27.78/0.7581 |
|  | 10% | 29.13/0.8169 | 26.28/0.7693 | 28.77/0.8129 | 29.92/0.8312 | 30.25/0.8426 | 30.85/0.8515 |
|  | 25% | — | 30.15/0.8813 | 33.12/0.9102 | 34.31/0.9213 | 34.37/0.9272 | 35.04/0.9316 |
|  | 50% | 37.89/0.9631 | 33.78/0.9440 | 38.09/0.9621 | 39.28/0.9684 | 39.95/0.9720 | 40.41/0.9730 |
| Direct Average | 1% | 22.25/0.5630 | 18.14/0.4713 | 21.07/0.5386 | 22.00/0.5725 | 22.87/0.6079 | 23.21/0.6212 |
|  | 4% | — | 23.75/0.6820 | 25.54/0.7408 | 26.07/0.7418 | 26.86/0.7691 | 27.41/0.7873 |
|  | 10% | 28.76/0.8326 | 26.94/0.7976 | 29.17/0.8503 | 29.61/0.8487 | 29.98/0.8606 | 30.72/0.8729 |
|  | 25% | — | 30.87/0.9025 | 33.63/0.9298 | 34.18/0.9317 | 34.33/0.9371 | 34.97/0.9415 |
|  | 50% | 37.77/0.9684 | 35.01/0.9531 | 38.69/0.9721 | 39.33/0.9745 | 39.84/0.9783 | 40.32/0.9786 |
| Weight Average | 1% | 21.56/0.5310 | 17.56/0.4431 | 20.79/0.5122 | 21.55/0.5426 | 22.22/0.5718 | 22.55/0.5855 |
|  | 4% | — | 22.57/0.6434 | 24.39/0.7077 | 24.89/0.7022 | 25.58/0.7316 | 26.32/0.7574 |
|  | 10% | 27.19/0.8017 | 25.80/0.7689 | 27.67/0.8301 | 27.99/0.8206 | 28.38/0.8357 | 29.42/0.8537 |
|  | 25% | — | 29.50/0.8903 | 32.12/0.9225 | 32.47/0.9203 | 32.64/0.9268 | 33.63/0.9342 |
|  | 50% | 35.84/0.9631 | 32.93/0.9444 | 37.26/0.9712 | 37.69/0.9718 | 38.07/0.9768 | 38.93/0.9774 |

To verify the effectiveness of the proposed method being derived from the designed architecture rather than training on the larger dataset, firstly the AMP-Net and OPINE-Net are retrained on the COCO dataset like the proposed method to conduct a fair comparison. The results are shown in Table II. The original AMP-Net is trained on the BSD500 dataset [58], and OPINE-Net is trained on the T91 dataset [5]. As shown in Table II, CSformer achieves the highest PSNR results under the same training dataset. Compared with the model trained on the BSD500 dataset and T91 dataset, the performances of the other two methods show varying degrees of improvement or decline across multiple datasets. In addition, the performance of AMP-Net and OPINE-Net on different training sets is also interesting and worth analyzing. The performance of OPINE-Net has generally improved compared to the original one and exceeds AMP-Net in most cases, while the performance of AMP-Net after retraining varies on different datasets. On the one hand, the reason for the inferior performance of OPINE-Net in Table I compared to AMP-Net is most likely due to the small training samples (T91<BSD500). It may thus be suggested that a larger training dataset may lead to better performance, especially for larger and more complex test sets. Another possible evidence is that the performance of the Urban100 dataset increases for both methods. On the other hand, the performance of AMP-Net on the BSD68 dataset has marked decline after training on the COCO dataset. A possible explanation is that the collection and data distribution of the training samples for the BSD500 dataset and the test samples of the BSD68 dataset have some homology. In contrast, training on another dataset may eliminate this homology bias.

TABLE II

PSNR/SSIM PERFORMANCE COMPARISON WITH DIFFERENT CS RATIOS ON VARIOUS TEST DATASETS.

| Dataset | CS ratio | OPINE-Net | AMP-Net | CSformer |
|---|---|---|---|---|
| Set11 | 1% | 20.30 | 20.09 | 21.95 |
|  | 4% | 25.58 | 24.93 | 26.93 |
|  | 10% | 29.90 | 29.51 | 30.66 |
|  | 25% | 34.66 | 34.47 | 35.46 |
|  | 50% | 39.56 | 39.99 | 41.04 |
| BSD68 | 1% | 21.98 | 21.88 | 23.07 |
|  | 4% | 25.22 | 24.97 | 25.91 |
|  | 10% | 27.87 | 27.64 | 28.28 |
|  | 25% | 31.53 | 31.40 | 31.91 |
|  | 50% | 36.16 | 36.30 | 37.16 |
| Urban100 | 1% | 20.91 | 20.91 | 21.94 |
|  | 4% | 24.52 | 24.67 | 26.13 |
|  | 10% | 28.72 | 28.03 | 29.61 |
|  | 25% | 33.26 | 32.93 | 34.16 |
|  | 50% | 38.10 | 38.63 | 39.46 |
| Set5 | 1% | 23.23 | 23.49 | 25.22 |
|  | 4% | 28.96 | 28.58 | 30.31 |
|  | 10% | 33.48 | 33.21 | 34.20 |
|  | 25% | 37.71 | 37.72 | 38.30 |
|  | 50% | 42.12 | 42.54 | 43.55 |
| Set14 | 1% | 22.58 | 22.71 | 23.88 |
|  | 4% | 26.83 | 26.86 | 27.78 |
|  | 10% | 30.26 | 30.16 | 30.85 |
|  | 25% | 34.42 | 34.36 | 35.04 |
|  | 50% | 39.04 | 39.45 | 40.41 |
| Direct Average | 1% | 21.80 (−1.41) | 21.82 (−1.39) | 23.21 |
|  | 4% | 26.22 (−1.19) | 26.00 (−1.41) | 27.41 |
|  | 10% | 30.05 (−0.67) | 29.71 (−1.01) | 30.72 |
|  | 25% | 34.32 (−0.65) | 34.18 (−0.79) | 34.97 |
|  | 50% | 39.00 (−1.32) | 39.38 (−0.94) | 40.32 |
| Weighted Average | 1% | 21.42 (−1.13) | 21.39 (−1.16) | 22.55 |
|  | 4% | 25.09 (−1.23) | 25.04 (−1.28) | 26.32 |
|  | 10% | 28.72 (−0.70) | 28.26 (−1.16) | 29.42 |
|  | 25% | 32.94 (−0.69) | 32.71 (−0.92) | 33.63 |
|  | 50% | 37.68 (−1.25) | 38.06 (−0.87) | 38.93 |

Figure 4:
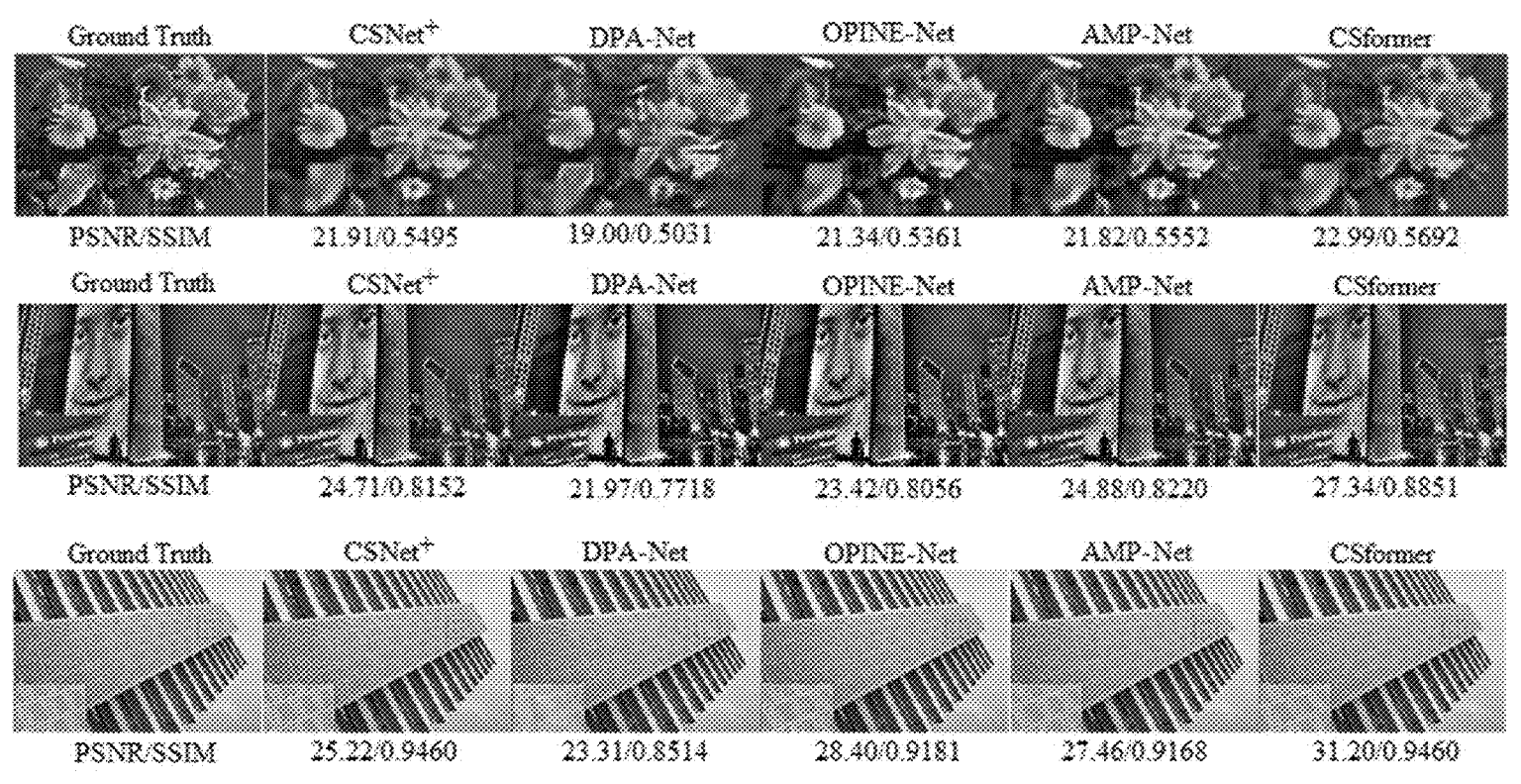

In FIG. 4, reconstructed images of all methods at CS ratios of 1%, 10%, and 50% are shown. CSformer recovers more fine details and more clear edges than other methods. The visible results in FIG. 4 at CS ratio of 50% show that CSformer generate more fine texture but others tend to generate blurred textures because the texture on the top regions of the building is relatively blurry. This may also indicate that the proposed method has satisfactory recovery capability for long-range dependence with the help of the transformer stem. The visual quality comparisons clearly demonstrate the effectiveness of CSformer. Overall, the quantitative and qualitative comparisons with several competing methods verify the superiority of CSformer.

Figure 5:
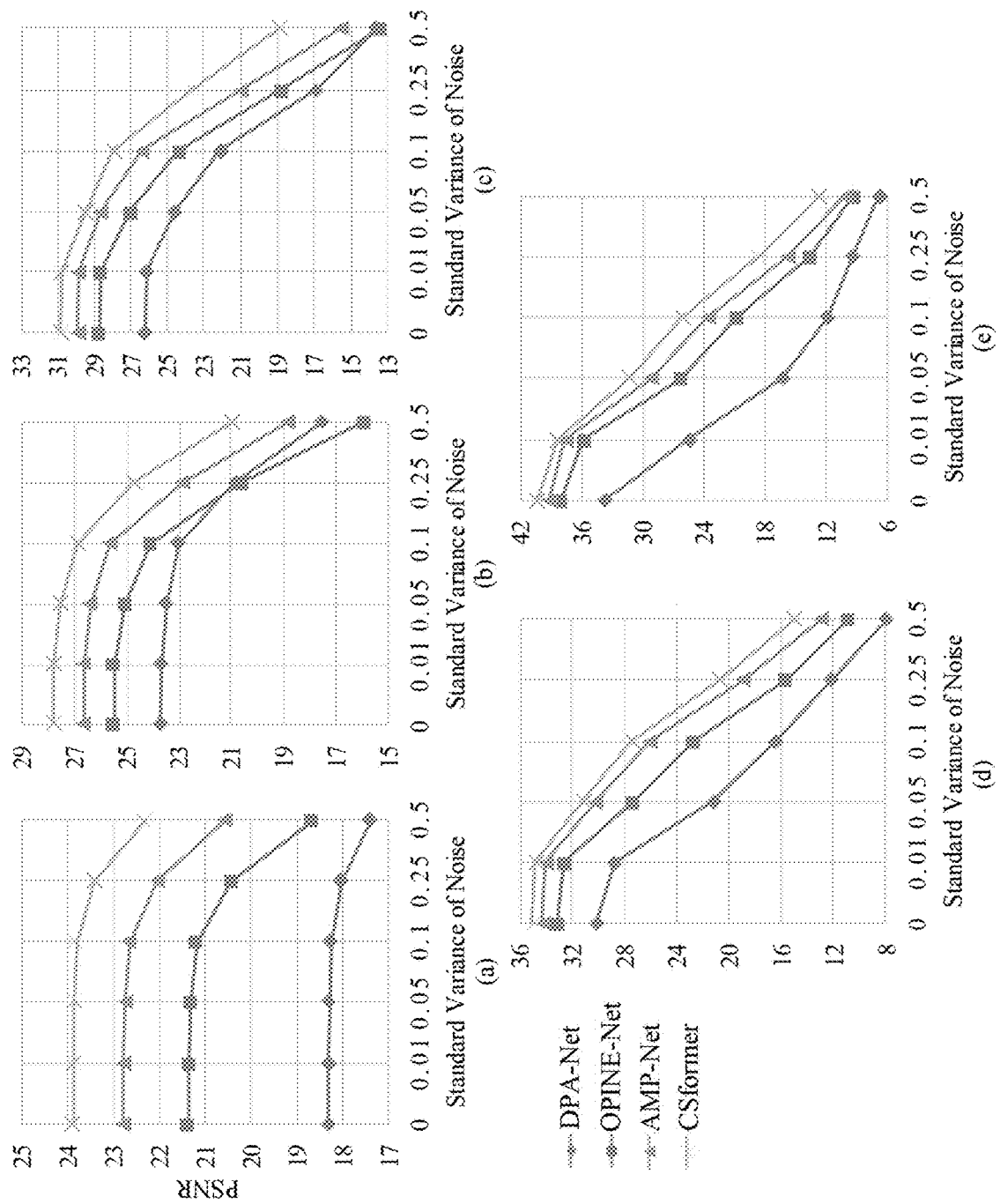
FIG. 5 illustrates a comparison of robustness to Gaussian noise. The CS ratios from (a) to (e) are 1%, 4%, 10%, 25%, and 50%, respectively.

To validate the robustness of the proposed method, the evaluation setting in [23] is followed. Five levels of the zero-mean Gaussian noise with different standard variances are added to the measurements during testing. The standard variances of the noise includes 0.01, 0.05, 0.1, 0.25, and 0.5. Then, the image is reconstructed from the noisy measurements. The performance versus various standard variances of noise at five CS ratios is presented in FIG. 5. It can be seen that CSformer achieves the best performance across all five noise levels under different CS ratios. Compared with other methods, CSformer shows strong robustness to noise corruption.

Figure 6:
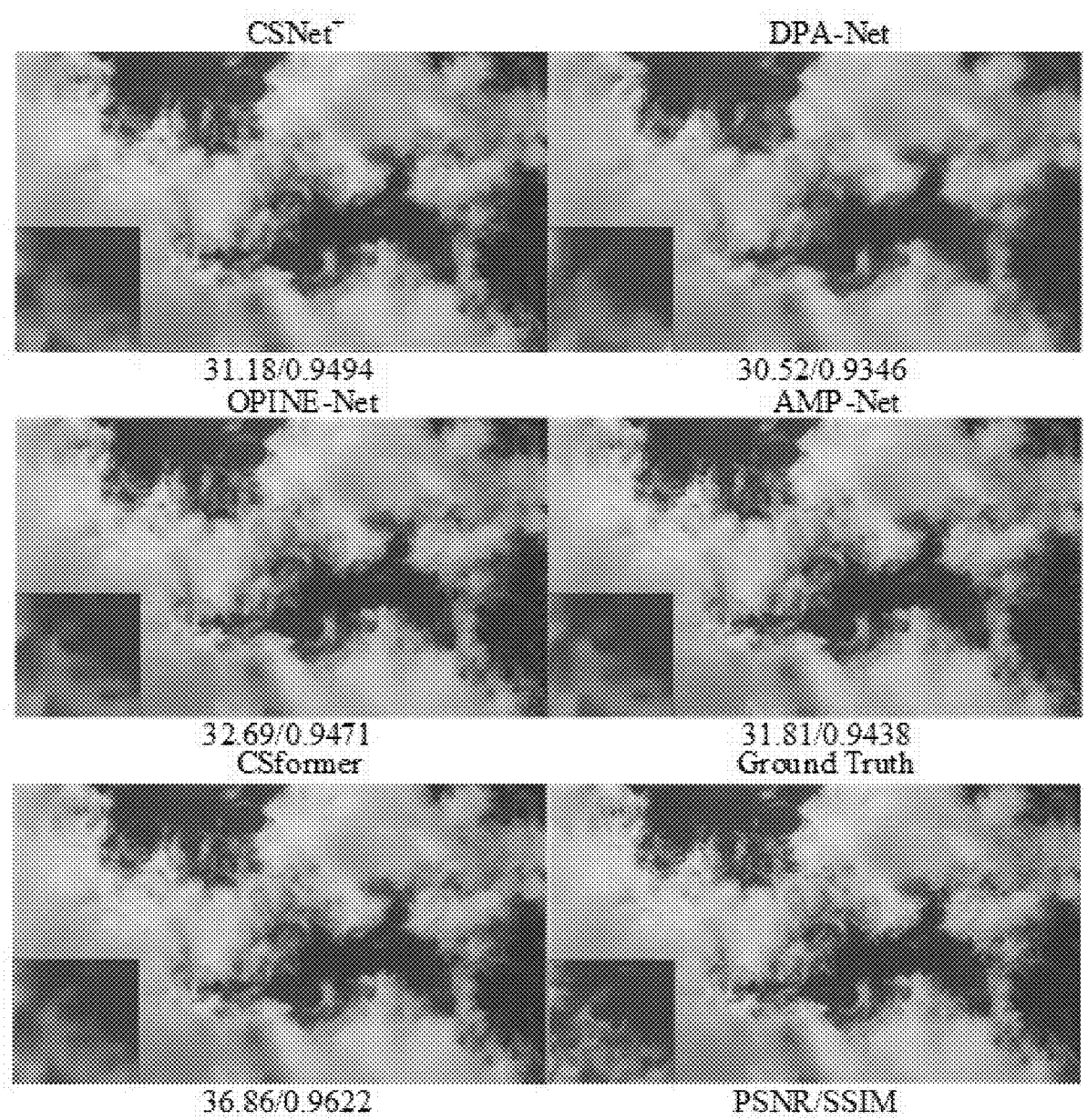
FIG. 6 illustrates a visual quality comparison of various CS methods on dynamic texture dataset at CS ratio of 1%.

Besides the standard test datasets, the applicability of dynamic textures [59]-[61] are tested. Firstly, a test dataset based on the dynamic texture dataBase (DTDB) [62] is built, which is a large-scale dynamic texture dataset with over 10,000 videos. Five frames are selected from different videos for the scenes (waves, clouds, smoke, semi-transparent object, dynamic texture of rotary motion, and particle objects) to form a dataset containing 30 images. The results are shown in Table III and FIG. 6. It can be observed that the proposed approach achieves the best performance in dynamic texture image reconstruction. The visual quality comparison results show the proposed method is closer to ground-truth in terms of texture and structure.

TABLE III

PSNR/SSIM PERFORMANCE COMPARISON WITH DIFFERENT SAMPLING RATIOS ON THE SELECTED DYNAMIC TEXTURE DATASET. THE BEST ONE IS SHOWN IN BOLD

| Method | Sampling Ratio | | | | |
|---|---|---|---|---|---|
| | 1% | 4% | 10% | 25% | 50% |
| CSNet+ | 30.30/ | — | 39.48/ | — | 51.85/ |
| | 0.8396 | | 0.9582 | | 0.9943 |
| DPA-Net | 27.70/ | 37.47/ | 40.39/ | 43.40/ | 46.39/ |
| | 0.8128 | 0.9050 | 0.9446 | 0.9748 | 0.9892 |
| OPINE-Net | 30.85/ | 37.72/ | 42.40/ | 45.63/ | 47.98/ |
| | 0.8415 | 0.9067 | 0.9598 | 0.9837 | 0.9922 |
| AMP-Net | 30.50/ | 35.66/ | 42.15/ | 45.89/ | 48.71/ |
| | 0.8375 | 0.9133 | 0.9597 | 0.9837 | 0.9931 |
| CSformer (Ours) | 33.75/ | 39.19/ | 44.43/ | 48.72/ | 53.08/ |
| | 0.8661 | 0.9370 | 0.9692 | 0.9882 | 0.9962 |

Next, effect on the illumination conditions is investigated. In this section, it is aimed to explore the how the illumination conditions may impact image quality by the proposed model. The proposed method is evaluated on the MEF dataset [63], which contains 20 multi-exposure sequences of dynamic scenes. Each sequence that contains three images representing under-exposure, overexposure, and in-between captures is selected. Then the proposed method is tested under these three different conditions. The results are depicted in Table IV. It can be seen that the reconstruction performance of overexposure and under-exposure is better than the in-between captures. One possible reason is that, subject to unfavorable lighting conditions, the images contain less information (texture, structure, etc.) and is easier to reconstruct.

TABLE IV

PSNR/SSIM PERFORMANCE COMPARISON ON VARIOUS ILLUMINATION CONDITIONS OF MEF DATASET [63]. THE BEST ONE IS SHOWN IN BOLD

| Illumination conditions | Sampling Ratio | | | | |
|---|---|---|---|---|---|
| | 1% | 4% | 10% | 25% | 50% |
| Under-exposure | 31.41/ | 35.82/ | 39.28/ | 43.67/ | 49.75/ |
| | 0.8475 | 0.9161 | 0.9518 | 0.9804 | 0.9953 |
| In-between captures | 28.03/ | 32.32/ | 35.55/ | 39.89/ | 45.97/ |
| | 0.7662 | 0.8690 | 0.9251 | 0.9698 | 0.9925 |
| Over-exposure | 28.93/ | 33.61/ | 36.94/ | 41.58/ | 48.01/ |
| | 0.8015 | 0.8972 | 0.9464 | 0.9812 | 0.9960 |

Next, ablation studies are provided. Table V shows the results for different dimensions, where the subscript represents the dimension of $C_0$. The smaller CSformer$_{64}$ is capable of achieving good performance on the five datasets. The CSformer$_{128}$ outperforms CSformer$_{64}$ at most of CS ratios. The largest improvement appears on the Urban100 dataset with average 0.4 dB. In addition, there are about 0.2 dB PSNR gains over Set11 and Set14. The larger CSformer$_{256}$ achieves around 0.1~0.2 dB gains than the second one but has the maximum number of parameters.

TABLE V

PSNR PERFORMANCE COMPARISON WITH DIFFERENT MODEL SIZES. THE BEST RESULTS ARE LABELED IN BOLD

| Method | Set11 | | | | BSD68 | | | | Urban100 | | | |
|---|---|---|---|---|---|---|---|---|---|---|---|---|
| | 1% | 10% | 50% | Avg. | 1% | 10% | 50% | Avg. | 1% | 10% | 50% | Avg. |
| CSformer$_{64}$ | 21.99 | 30.26 | 40.89 | 31.05 | 23.06 | 28.14 | 37.16 | 29.45 | 21.93 | 29.06 | 38.88 | 29.96 |
| CSformer$_{128}$ | 21.95 | 30.66 | 41.04 | 31.22 | 23.07 | 28.28 | 37.16 | 29.50 | 21.94 | 29.61 | 39.46 | 30.34 |
| CSformer$_{256}$ | 21.94 | 30.89 | 41.22 | 31.35 | 23.03 | 28.40 | 37.26 | 29.56 | 21.85 | 30.05 | 39.75 | 30.55 |

| Method | Set5 | | | | Set14 | | | | | |
|---|---|---|---|---|---|---|---|---|---|---|
| | 1% | 10% | 50% | Avg. | 1% | 10% | 50% | Avg. | Param | FLOPs |
| CSformer$_{64}$ | 25.24 | 33.90 | 43.53 | 34.22 | 23.90 | 30.56 | 40.21 | 31.56 | 1.76M | 4.63G |
| CSformer$_{128}$ | 25.22 | 34.20 | 43.55 | 34.32 | 23.88 | 30.85 | 40.41 | 31.71 | 6.71M | 18.40G |
| CSformer$_{256}$ | 25.18 | 34.31 | 43.76 | 34.42 | 23.84 | 31.00 | 40.56 | 31.80 | 24.94M | 72.93G |

CSformer is a dual stem model, aiming to couple the efficiency of convolution in extracting local features with the power of transformer in modeling global representations. To evaluate the benefits of these two branches, two single-path models are built, one named "SPC" that adopts the single CNN path, and another is "SPT", which only uses the transformer branch for reconstruction. It is worth mentioning that it is not just removing a branch on CSformer, but it is adjusting the number of layers and dimensions of SPC and SPT to keep the number of parameters and the floating-point operations (FLOPs) of the model close to CSformer. Thus, for a fair comparison, the layers of convolution block for SPC are increased. Then, for SPT, one more 1×1 convolution is added before transformer block and set $C_0=256$ to maintain the consistency of resolution and dimension in transformer block. In addition, the Initialization branch and all other modules are kept unchanged. The testing is implemented on the Urban100 dataset and Set11 dataset as depicted in Table VI and Table VII. The number of parameters and the FLOPs of recovering a 256×256 image are depicted in the table. On the Urban100 dataset, CSformer shows superior PSNR performance at different CS ratios with at most 0.84 dB gains than SPT and 2.89 dB gains than SPC. The gap ascends with the increase of sampling ratio and achieves the largest gap at CS ratio of 50%. The improvement of CSformer is more noticeable at high ratios. The reason may be explained by the fact that the SPC performs insufficient feature extraction from the measurements due to the lack of long-range dependencies at high CS ratios. For SPT, the trunk recovery network recovers the residuals according to the initial reconstruction, while under high sampling ratios the initial reconstruction is relatively sufficient. Therefore, the detailed and local information provided by CNN is more helpful for the final reconstruction. On the Set11 dataset, the performance of SPC is lower than SPT and CSformer at all CS ratios. CSformer shows better results at CS ratio of 1% while has slight performances drop than SPT at other ratios. This is partly due to the increase in the number of parameters and partly reflects the powerful modeling capability of the transformer network. Meanwhile, CSformer plays more critical roles on the Urban100 dataset than the Set11 dataset. The reason can be attributed to the fact that the Urban100 dataset has more textured data, making the local information more helpful for the reconstruction. In this case, the convolution is more efficient and practical for image local feature extraction.

TABLE VI

PSNR PERFORMANCE COMPARISON OF THE PROPOSED CSFORMER WITH THE SINGLE-PATH CNN (SPC) AND THE SINGLE-PATH TRANSFORMER (SPT) ON SET11

| Method | 1% | 4% | 10% | 25% | 50% | Param | FLOPs |
|---|---|---|---|---|---|---|---|
| SPC | 21.67 | 26.73 | 30.12 | 34.51 | 39.85 | 7.85M | 22.33G |
| SPT | 21.71 | 26.95 | 30.76 | 35.50 | 41.05 | 7.40M | 17.75G |
| CSformer | 21.95 | 26.93 | 30.66 | 35.46 | 41.04 | 6.71M | 18.40G |

TABLE VII

PSNR PERFORMANCE COMPARISON OF THE PROPOSED CSFORMER WITH THE SINGLE-PATH CNN (SPC) AND THE SINGLE-PATH TRANSFORMER (SPT) ON URBAN100

| Method | 1% | 4% | 10% | 25% | 50% | Param | FLOPs |
|---|---|---|---|---|---|---|---|
| SPC | 21.86 | 25.61 | 28.48 | 32.34 | 36.57 | 7.85M | 22.33G |
| SPT | 21.81 | 25.91 | 29.50 | 33.61 | 38.62 | 7.40M | 17.75G |
| CSformer | 21.94 | 26.13 | 29.61 | 34.16 | 39.46 | 6.71M | 18.40G |

Figure 7:
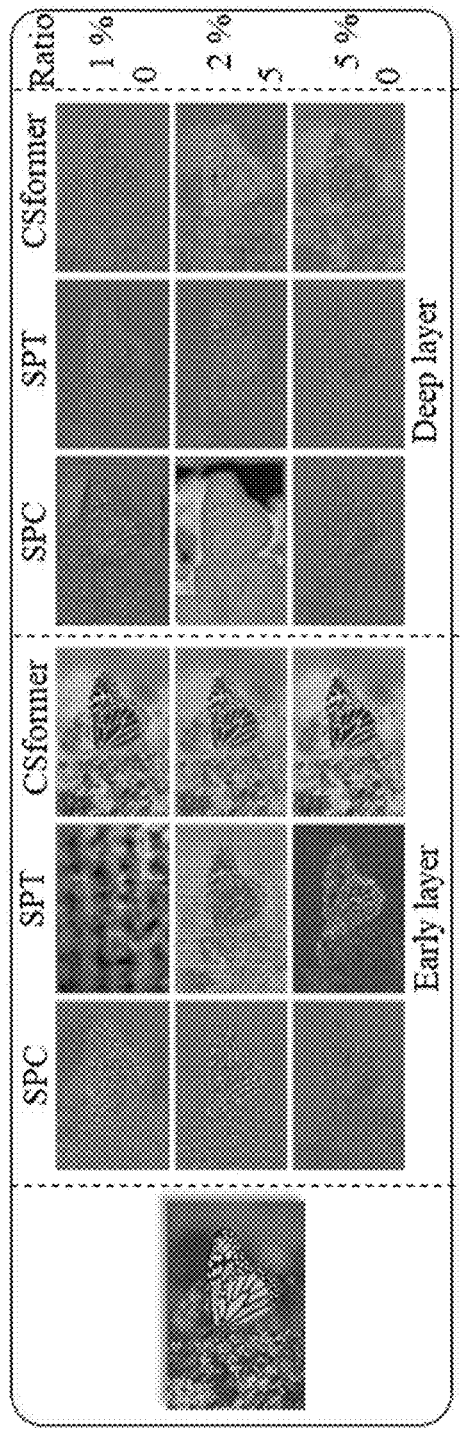
FIG. 7. Illustrates a comparison of feature map of the single-path CNN (SPC), single-path transformer (SPT), and CSformer.

Next, the difference of the internal features representations between CNN and transformer is investigated by feature visualization and feature similarity. The feature maps in FIG. 7 are firstly visualized. It can be seen that the SPC focuses on more local fine details than SPT. In contrast, the SPT is more adept at capturing long-range interactions than SPC, especially in the early layers. One possible reason is the small receptive field of CNN in the early layers. Compared with CSformer, the SPT tends to activate more global areas than the local region. Besides, with the help of the local information extracted by CNN, the detailed textures are remained in CSformer. This figure shows the ability of CSformer in bridging the local feature and global representation, which enhances the locality of features through convolution starting from the early layer. The early local intervention is a helpful complement to transformer features.

Figure 8:
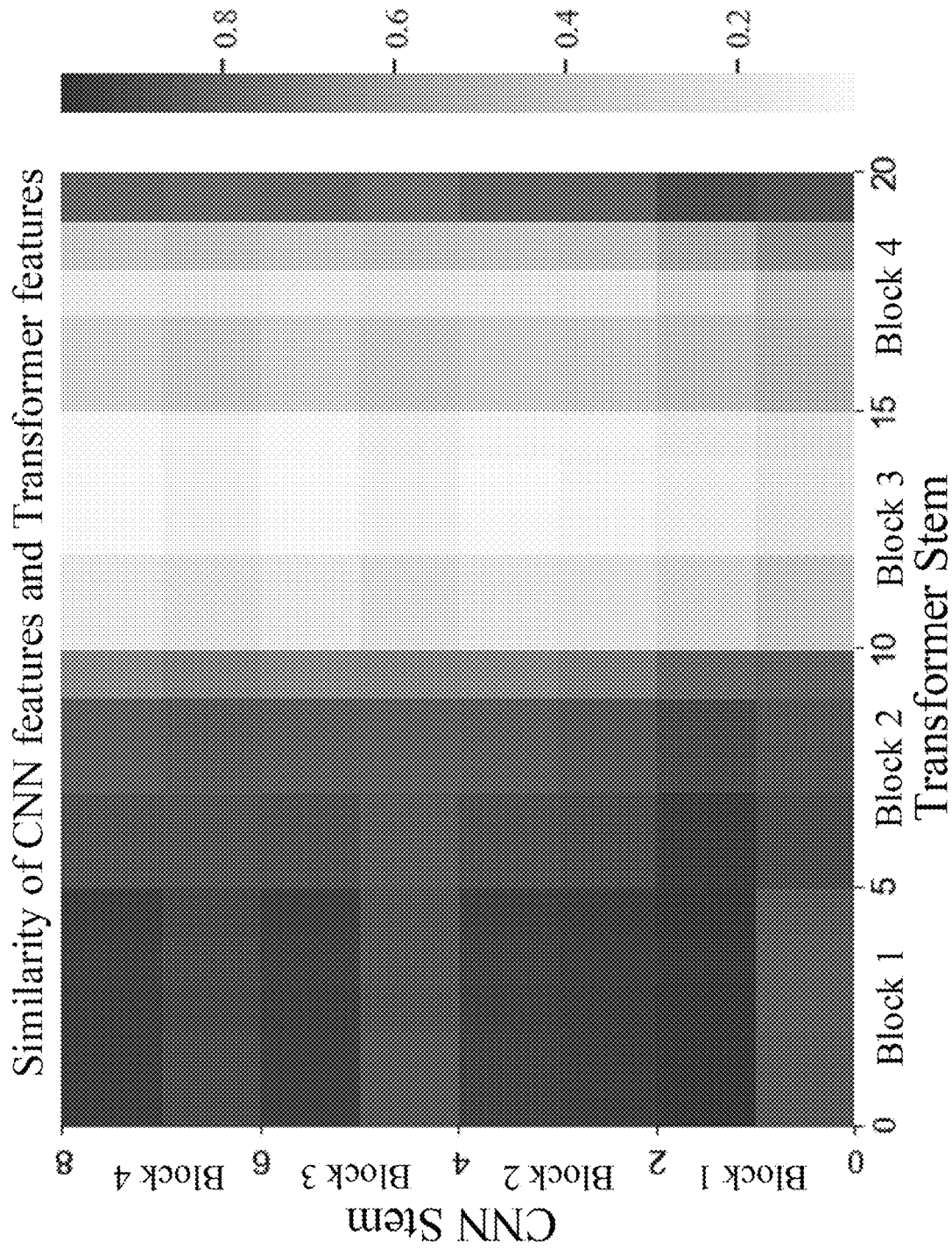
FIG. 8 shows a comparison of similarity of CNN stem and transformer stem.

In FIG. 8, the CNN features and transformer features are extracted from CNN stem and transformer stem, respectively. The features are analyzed from the perspective of representation similarity using centered kernel alignment [64]. It is worth mentioning that the transformer features already contain the CNN features as the fusion features the input of transformer block. The lower layers of transformer block are observed to be similar to the deep layers of CNN. It shows the transformer has a good ability to capture the long-dependence from the beginning, while CNN requires more dependence on the stacking of layers to enhance long-distance feature dependencies. In addition, it indicates that the CNN features play a more critical role in the early layers than deep layers. The middle features show weak similarity, which indicates the transformer features show more dominant effects. The deep layers show moderate similarity, and it illustrates that CSformer balances the local and global representation in the deep layers.

To figure out the effectiveness of the architecture design of the proposed method, experiments are conducted to compare CSformer with the following ensemble models: 1) dual CNN stems (DCS), using two CNN stems; 2) dual transformer stems (DTS), using two transformer stems; 3) transpose transformer and CNN stems (TTCS), permuting the transformer stem and CNN stem in FIG. 1, letting the output from the CNN stem. For a fair comparison, the number of layers of CNN Stem or transformer Stem are adjusted to close the number of parameters of all comparison variants. All the training settings and other parts of the framework remain unchanged. The results are shown in Table VIII. CSformer achieves the best performance over all CS ratios across five datasets. It can be observed that the transformer shows a better performance than CNN in most cases. Besides, compared to TTCS, CSformer significantly improves the performance, which indicates that the architecture design of the CNN stem and transformer stem has a significant impact.

TABLE VIII

PSNR/SSIM PERFORMANCE COMPARISON WITH DIFFERENT CS RATIOS ON VARIOUS TEST DATASETS. THE BEST ONE IS SHOWN IN THE LAST COLUMN AND THE SECOND BEST IN BOLD

| Dataset | ratio | CSNet | DPA-Net | OPINE-Net | AMP-Net | CSformer$_{bsd40}$ | CSformer$_{coco}$ |
|---|---|---|---|---|---|---|---|
| Set11 | 1% | 21.03/0.5566 | 18.05/0.5011 | 20.15/0.5340 | 20.57/0.5639 | 21.58/0.6075 | 21.95/0.6241 |
| | 4% | — | 23.50/0.7205 | 25.69/0.7920 | 25.26/0.7722 | 26.28/0.8062 | 26.93/0.8251 |
| | 10% | 28.37/0.8580 | 26.99/0.8354 | 29.81/0.8884 | 29.45/0.8787 | 29.79/0.8883 | 30.66/0.9027 |
| | 25% | — | 31.74/0.9238 | 34.86/0.9509 | 34.63/0.9481 | 34.81/0.9527 | 35.46/0.9570 |
| | 50% | 38.52/0.9749 | 36.73/0.9670 | 40.17/0.9797 | 40.34/0.9807 | 40.73/0.9824 | 41.04/0.9831 |
| BSD68 | 1% | 22.36/0.5273 | 18.98/0.4643 | 22.11/0.5140 | 22.28/0.5387 | 22.81/0.5566 | 23.07/0.5591 |
| | 4% | — | 23.27/0.6096 | 25.20/0.6825 | 25.26/0.6760 | 25.73/0.6956 | 25.91/0.7045 |
| | 10% | 27.18/0.7766 | 25.57/0.7267 | 27.82/0.8045 | 27.86/0.7926 | 28.05/0.8045 | 28.28/0.8078 |
| | 25% | — | 29.68/0.8763 | 31.51/0.9061 | 31.74/0.9048 | 31.82/0.9106 | 31.91/0.9102 |
| | 50% | 35.42/0.9614 | 32.89/0.9373 | 36.35/0.9660 | 36.82/0.9680 | 37.14/0.9766 | 37.16/0.9714 |
| Urban100 | 1% | 20.75/0.5204 | 16.36/0.4162 | 19.82/0.5006 | 20.90/0.5328 | 21.57/0.5672 | 21.94/0.5885 |
| | 4% | — | 21.64/0.6498 | 23.36/0.7114 | 24.15/0.7029 | 24.94/0.7396 | 26.13/0.7803 |
| | 10% | 26.52/0.8053 | 25.54/0.7851 | 26.93/0.8397 | 27.38/0.8270 | 27.92/0.8458 | 29.61/0.8762 |
| | 25% | — | 28.81/0.8951 | 31.86/0.9308 | 32.19/0.9258 | 32.43/0.9332 | 34.16/0.9470 |
| | 50% | 35.25/0.9621 | 32.09/0.9454 | 37.23/0.9747 | 37.51/0.9734 | 37.88/0.9766 | 39.46/0.9811 |
| Set5 | 1% | 24.18/0.6478 | 19.02/0.5133 | 21.89/0.6101 | 23.48/0.6518 | 24.85/0.7052 | 25.22/0.7197 |
| | 4% | — | 26.63/0.7767 | 27.95/0.8209 | 29.01/0.8359 | 30.04/0.8593 | 30.31/0.8686 |
| | 10% | 32.59/0.9062 | 30.32/0.8713 | 32.51/0.9058 | 33.42/0.9140 | 33.90/0.9220 | 34.20/0.9262 |
| | 25% | — | 33.96/0.9360 | 36.78/0.9510 | 38.03/0.9586 | 38.24/0.9618 | 38.30/0.9619 |
| | 50% | 41.79/0.9803 | 39.57/0.9716 | 41.62/0.9779 | 42.72/0.9818 | 43.48/0.9840 | 43.55/0.9845 |
| Set14 | 1% | 22.92/0.5630 | 18.30/0.4616 | 21.36/0.5345 | 22.79/0.5751 | 23.56/0.6032 | 23.88/0.6146 |
| | 4% | — | 23.69/0.6534 | 25.50/0.6974 | 26.67/0.7219 | 27.31/0.7449 | 27.78/0.7581 |
| | 10% | 29.13/0.8169 | 26.28/0.7693 | 28.77/0.8129 | 29.92/0.8312 | 30.25/0.8426 | 30.85/0.8515 |
| | 25% | — | 30.15/0.8813 | 33.12/0.9102 | 34.31/0.9213 | 34.37/0.9272 | 35.04/0.9316 |
| | 50% | 37.89/0.9631 | 33.78/0.9440 | 38.09/0.9621 | 39.28/0.9684 | 39.95/0.9720 | 40.41/0.9730 |
| Direct Average | 1% | 22.25/0.5630 | 18.14/0.4713 | 21.07/0.5386 | 22.00/0.5725 | 22.87/0.6079 | 23.21/0.6212 |
| | 4% | — | 23.75/0.6820 | 25.54/0.7408 | 26.07/0.7418 | 26.86/0.7691 | 27.41/0.7873 |
| | 10% | 28.76/0.8326 | 26.94/0.7976 | 29.17/0.8503 | 29.61/0.8487 | 29.98/0.8606 | 30.72/0.8729 |
| | 25% | — | 30.87/0.9025 | 33.63/0.9298 | 34.18/0.9317 | 34.33/0.9371 | 34.97/0.9415 |
| | 50% | 37.77/0.9684 | 35.01/0.9531 | 38.69/0.9721 | 39.33/0.9745 | 39.84/0.9783 | 40.32/0.9786 |
| Weight Average | 1% | 21.56/0.5310 | 17.56/0.4431 | 20.79/0.5122 | 21.55/0.5426 | 22.22/0.5718 | 22.55/0.5855 |
| | 4% | — | 22.57/0.6434 | 24.39/0.7077 | 24.89/0.7022 | 25.58/0.7316 | 26.32/0.7574 |
| | 10% | 27.19/0.8017 | 25.80/0.7689 | 27.67/0.8301 | 27.99/0.8206 | 28.38/0.8357 | 29.42/0.8537 |
| | 25% | — | 29.50/0.8903 | 32.12/0.9225 | 32.47/0.9203 | 32.64/0.9268 | 33.63/0.9342 |
| | 50% | 35.84/0.9631 | 32.93/0.9444 | 37.26/0.9712 | 37.69/0.9718 | 38.07/0.9768 | 38.93/0.9774 |

Figure 9:
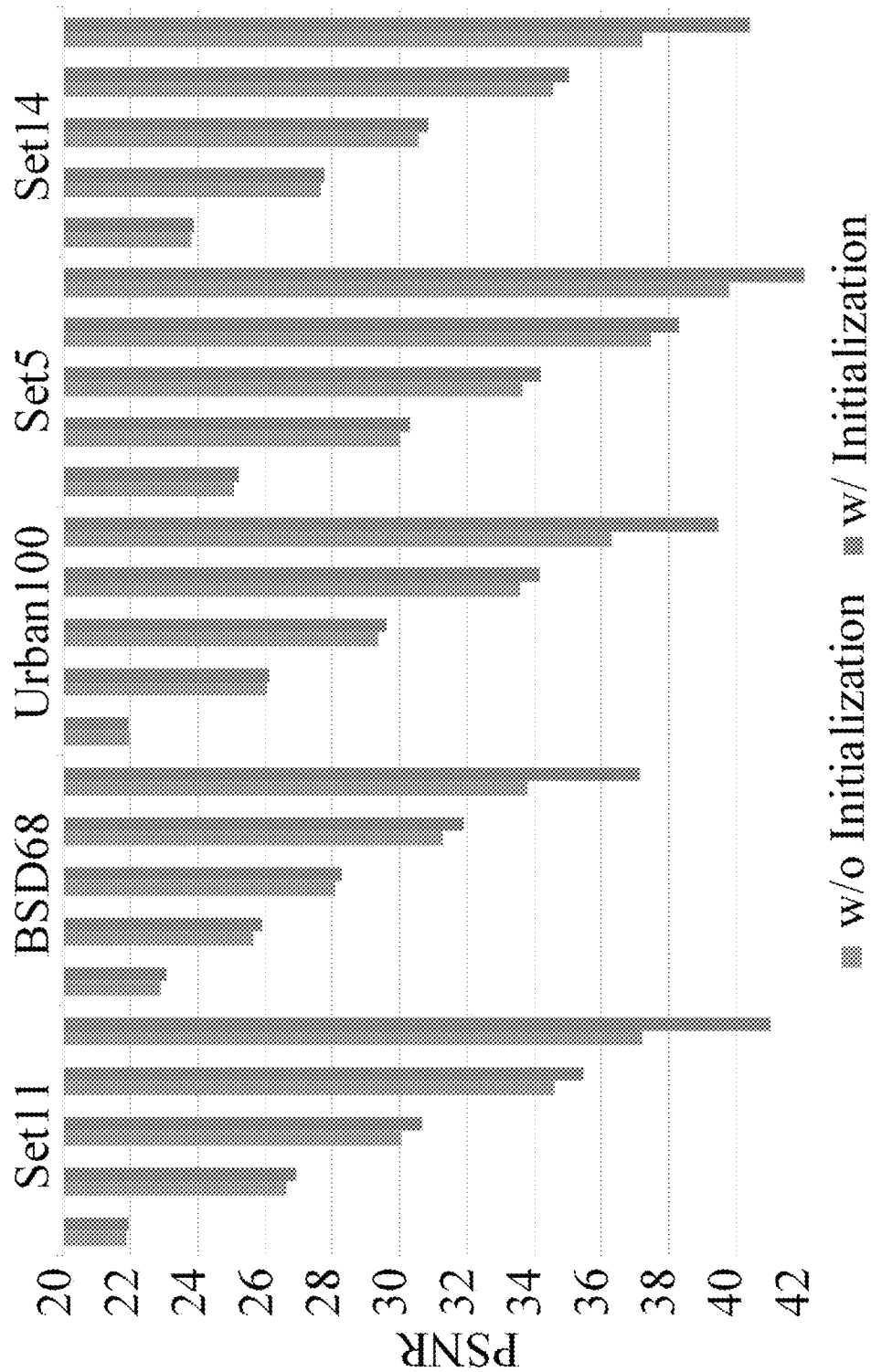
FIG. 9 shows a comparison between CSformer without the Initialization branch and with the Initialization branch.

Besides the dual stem of transformer and CNN for reconstruction, the other branch is the initialization, which takes the measurements as input and to generate initial reconstruction. In this way, CSformer employs global residual learning for reconstruction, which may help the transformer and CNN stems to accelerate convergence and further improve the reconstruction quality. In FIG. 9, CSformer without the Initialization branch and with the Initialization branch are compared. It can be seen that the Initialization branch helps to improve the performance, especially at higher CS ratios.

The size of the sampling matrix and reconstructed patch may affect the CS performance. For the method that uses learned sampling convolution instead of a sampling matrix, the size of the sampling matrix corresponds to the size of the sampling block of the convolution. And the patch size represents the $H_p$, $W_p$. The results with different sizes of sampling block (SB) and patch (PT) are illustrated in Table IX. The number after SB and PT denotes the size, where SB 16, PT32 means sampling block size is 16×16 and patch size is 32×32. For the models with PT32, the number of layers and other parameters of the network structure are kept unchanged compared with PT64 and only change the input patch size, which means that the input feature size $H_0 \times W_0 = 4 \times 4$. For different SB sizes, only the convolution block size B is changed. As shown in Table IX, the larger reconstructed patch size always performs better than the smaller patch size. A larger patch size might yield better performance but given the computational complexity, thus the patch size of 64 is chosen. Second, comparing the performance of different sampling block sizes under the same patch size shows that 16×16 blocks tend to have better performance at lower sample rates and at 50% sampling rate on Urban100 dataset. Thus, a block size of 16 is adopted as default. Overall, the gap is not obvious in most cases. The proposed method can achieve good performance both under size of SB 16 and 32.

TABLE IX

PSNR PERFORMANCE COMPARISON ON CSFORMER WITH DIFFERENT SIZES OF SAMPLING BLOCK (SB) AND PATCH (PT). THE BEST RESULTS ARE LABELED IN BOLD

| Dataset | CS ratio | SB16, PT32 | SB32, PT64 | SB16, PT64 |
|---|---|---|---|---|
| Set11 | 1% | 21.51 | 21.96 | 21.95 |
| | 4% | 26.65 | 26.99 | 26.93 |
| | 10% | 30.42 | 30.53 | 30.66 |
| | 25% | 35.26 | 36.06 | 35.46 |
| | 50% | 40.83 | 41.02 | 41.04 |
| BSD68 | 1% | 22.78 | 22.96 | 23.07 |
| | 4% | 25.73 | 25.82 | 25.91 |
| | 10% | 28.09 | 28.28 | 28.28 |
| | 25% | 31.84 | 32.52 | 31.91 |
| | 50% | 37.03 | 37.40 | 37.16 |
| Urban100 | 1% | 21.44 | 21.84 | 21.94 |
| | 4% | 25.63 | 25.95 | 26.13 |
| | 10% | 29.25 | 29.33 | 29.61 |
| | 25% | 33.85 | 34.42 | 34.16 |
| | 50% | 39.29 | 38.81 | 39.46 |

TABLE IX-continued

PSNR PERFORMANCE COMPARISON ON CSFORMER WITH DIFFERENT SIZES OF SAMPLING BLOCK (SB) AND PATCH (PT). THE BEST RESULTS ARE LABELED IN BOLD

| Dataset | CS ratio | SB16, PT32 | SB32, PT64 | SB16, PT64 |
|---|---|---|---|---|
| Set5 | 1% | 24.71 | 25.06 | 25.22 |
| | 4% | 30.02 | 30.47 | 30.31 |
| | 10% | 34.08 | 34.16 | 34.20 |
| | 25% | 38.22 | 38.86 | 38.30 |
| | 50% | 43.24 | 43.73 | 43.55 |
| Set14 | 1% | 23.45 | 23.80 | 23.88 |
| | 4% | 27.55 | 27.94 | 27.78 |
| | 10% | 30.69 | 30.74 | 30.85 |
| | 25% | 34.88 | 35.49 | 35.04 |
| | 50% | 40.19 | 40.38 | 40.41 |

Table X provides the parameter number of various CS methods at CS ratio of 50%, FLOPs, and the time-consuming analysis for reconstructing a 256×256 image. Considering that the transformer model and the CNN model are utilized, the total parameters of the proposed method are still 30% lower than the DPA-Net using the dual-path CNN structure. And the FLOPs of the proposed method is the smallest compared with others. Though the running time increases, CSformer achieves the best performance and generalization capabilities.

TABLE X

COMPARISON OF THE MODEL SIZE AND RUNNING TIME (IN SECONDS) FOR RECONSTRUCTING A 256 × 256 IMAGE

| Method | CSNet+ | DPA-Net | OPINE-Net | AMP-Net | CSformer |
|---|---|---|---|---|---|
| Param | 5.00M | 9.78M | 1.10M | 1.53M | 6.71M |
| Time | 0.0176 | 0.0339 | 0.0140 | 0.0322 | 5.0765 |
| FLOPs | 27.05G | 106.36G | 47.47G | 23.97G | 18.40G |

In summary, one can see that the CSformer is a hybrid framework that couples transformer with CNN for adaptive sampling and reconstruction of image CS. It is well-designed for end-to-end compressive image sensing, composed of adaptive sampling and recovery. In the sampling module, images are measured block-by-block by the learned sampling matrix. In the reconstruction stage, the measurements are projected into an initialization stem, a CNN stem, and a transformer stem. To make full use of the complementary features of transformer and CNN, progressive reconstruction is introduced to aggregate the multi-scale features with an additional initialization branch, which is thoughtfully designed for image CS to balance the complexity and performance. The progressive reconstruction strategy processes the feature maps, enhancing the feature representation by multi-scale features while reducing memory cost and computational complexity. The initialization stem mimics traditional reconstruction of compressive sensing but generates the initial reconstruction in a learnable and efficient manner. The CNN stem and transformer stem are concurrent, simultaneously calculating fine-grained and long-range features and efficiently aggregating them. The two concurrent branches that consist of the CNN stem and the transformer stem generate two feature maps with different resolutions. Such a structure naturally integrates the advantages of leveraging both detailed spatial information from CNN and the global context provided by transformer to the maximum extent. Furthermore, a progressive strategy and window-based transformer block are explored to reduce the parameters and computational complexity. The experimental results demonstrate the effectiveness of the dedicated transformer-based architecture for compressive sensing, which achieves superior performance compared to state-of-the-art methods on different datasets.

Compared with the prevalent CNN-based methods, CSformer benefits from several aspects: (1) Self-attention mechanism ensures the content-dependency between image and attention weight. The attention mechanism is closely related to the human visual and perceptual system [30] and enables spatially adaptive feature activation with the emphasis on more challenging areas (i.e., rich textures, saliency, etc.) [31]. (2) Compared with CNN which focuses only on local characteristics, transformer is adept at long-range characteristics, making it can easily derive global information [32] that may be helpful for reconstruction. (3) CNN stem in the proposed method provides a locality to transformer that lacks in addressing long-range dependencies. (4) Progressive reconstruction balances the complexity and efficiency. To the best of the inventors' knowledge, CSformer is the first work to apply the transformer to CS. Experimental results demonstrate that the proposed method has a promising performance and outperforms existing iterative methods and DL based methods. The main contributions of this work can be summarized as follows: 1) CSformer is a hybrid framework that couples transformer with CNN for adaptive sampling and reconstruction of image CS. CSformer inherits both local features from CNN and global representations from transformer. 2) To make full use of the complementary features of transformer and CNN, progressive reconstruction is introduced to aggregate the multi-scale features with an additional initialization branch, which is thoughtfully designed for image CS to balance the complexity and performance. 3) Extensive experiments demonstrate the superiority of CSformer. The great potential of transformer in combination with CNN for CS is revealed.

The exemplary embodiments are thus fully described. Although the description referred to particular embodiments, it will be clear to one skilled in the art that the invention may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

The functional units and modules of the systems and methods in accordance with the embodiments disclosed herein may be implemented using computing devices, computer processors, or electronic circuitries including but not limited to application-specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance with the embodiments may be executed in one or more computing devices including server computers, personal computers, laptop computers, and mobile computing devices such as smartphones and tablet computers.

The embodiments include computer storage media, transient and non-transient memory devices having computer instructions or software codes stored therein which can be used to program computers or microprocessors to perform any of the processes of the present invention. The storage media, transient and non-transitory computer-readable storage medium can include but are not limited to floppy disks, optical discs, Blu-ray Disc, DVD, CD-ROMs, magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in a distributed fashion by one or more processing devices interconnected by a communication network, such as an intranet, WAN, LAN, the Internet, and other forms of data transmission medium.

What is claimed is:

1. A method for adaptive reconstruction of a compressively sensed data, comprising steps of:
   a) receiving sensed data;
   b) conducting an initial reconstruction to the sensed data to obtain a plurality of first reconstruction patches;
   c) by a reconstruction module, conducting a progressive reconstruction to the sensed data to obtain a plurality of second reconstruction patches;
   d) summing the plurality of second reconstruction patches with the a plurality of first reconstruction patches to obtain final patches; and
   e) merging the final patches to obtain a reconstructed data, wherein the progressive reconstruction further comprises concatenating transformer features and convolution features to obtain the second reconstruction patches.

2. The method according to claim 1, wherein the reconstruction module comprises a Convolutional Neural Network (CNN) stem for producing the convolution features, and a transformer stem for producing the transformer features.

3. The method according to claim 2, wherein the transformer stem comprises a first transformer block and a second transformer block; the CNN stem comprising a first convolution block corresponding to the first transformer block, and a second convolution block corresponding to the second transformer block; and wherein Step c) further comprising steps of:
   f) generating a first transformer feature of the transformer features at the first transformer block based on the sensed data and an output of the first convolution block;
   g) generating a second transformer feature of the transformer features at the second transformer block based on the first transformer feature and an output of the second convolution block.

4. The method of claim 3, wherein at least one of the first and second convolution blocks comprises a plurality of convolution layers, followed by a leaky rectified linear unit (ReLU) and a batch norm layer.

5. The method of claim 3, wherein at least one of the first and second transformer blocks is a window-based transformer.

6. The method of claim 5, wherein at least one of the first and second transformer blocks comprises a multi-head self-attention (MSA) module, followed by a multi-layer perceptron (MLP) module.

7. The method according to claim 2, wherein the reconstruction module further comprises an input projection module before the CNN stem and the transformer stem; and wherein Step c) further comprising a step of increasing a dimension of the sensed data inputted to the reconstruction module by the input projection module.

8. The method according to claim 7, wherein the input projection module comprises a plurality of 1×1 convolution layers and a sub-pixel convolution layer.

9. The method according to claim 2, wherein the reconstruction module further comprises an output projection module after the transformer stem; and wherein Step c) further comprising a step of projecting the transformer features into a single channel to obtain the plurality of second reconstruction patches.

10. The method according to claim 9, wherein the output projection module comprises a plurality of convolution layers followed by a tanh action function.

11. The method according to claim 1, wherein the step of conducting an initial reconstruction is performed on a linear initialization module.

12. The method according to claim 11, wherein the linear initialization module comprises a 1×1 convolution layer and a sub-pixel convolution layer.

13. The method according to claim 1, wherein the sensed data comprises a plurality of input convolutional patches.

14. An apparatus for adaptive reconstruction of a compressively sensed data, comprising:
   a) one or more processors; and
   b) a memory storing computer-executable instructions that, when executed, cause the one or more processors to
      i) receive a sensed data;
      ii) conduct an initial reconstruction to the sensed data to obtain a plurality of first reconstruction patches;
      iii) conduct a progressive reconstruction to the sensed data to obtain a plurality of second reconstruction patches;
      iv) sum the plurality of second reconstruction patches with the a plurality of first reconstruction patches to obtain final patches; and
      v) merge the final patches to obtain a reconstructed data,
   wherein the progressive reconstruction further comprises concatenating transformer features and convolution features to obtain the second reconstruction patches.

15. A non-transitory computer readable medium, comprising executable instructions that, when executed by at least one processor, direct the at least one processor to perform a method, the method comprising:
   a) receiving a sensed data;
   b) conducting an initial reconstruction to the sensed data to obtain a plurality of first reconstruction patches;
   c) by a reconstruction module, conducting a progressive reconstruction to the sensed data to obtain a plurality of second reconstruction patches;
   d) summing the plurality of second reconstruction patches with the a plurality of first reconstruction patches to obtain final patches; and e) merging the final patches to obtain a reconstructed data, wherein the progressive reconstruction further comprises concatenating transformer features and convolution features to obtain the second reconstruction patches.

\* \* \* \* \*